US012590235B2

(12) United States Patent
Itano et al.

(10) Patent No.: US 12,590,235 B2
(45) Date of Patent: *Mar. 31, 2026

(54) COMPOSITION CONTAINING REFRIGERANT, USE OF SAME, REFRIGERATOR HAVING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Daisuke Karube, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 546 days.

This patent is subject to a terminal disclaimer.

(21) Appl. No.: 17/550,223

(22) Filed: Dec. 14, 2021

(65) Prior Publication Data

US 2022/0098460 A1     Mar. 31, 2022

Related U.S. Application Data

(63) Continuation of application No. PCT/JP2020/024157, filed on Jun. 19, 2020.

(30) Foreign Application Priority Data

Jun. 19, 2019     (JP) ................................. 2019-114159

(51) Int. Cl.
*C09K 5/04*          (2006.01)
*F25B 13/00*          (2006.01)

(52) U.S. Cl.
CPC ........ *C09K 5/045* (2013.01); *C09K 2205/126* (2013.01); *F25B 13/00* (2013.01)

(58) Field of Classification Search
CPC .......... C09K 5/04; C09K 5/041; C09K 5/044; C09K 5/045; C09K 2205/126;
(Continued)

(56) References Cited

U.S. PATENT DOCUMENTS

2016/0333243 A1* 11/2016 Fukushima ............ C09K 5/045
2017/0002245 A1*  1/2017 Fukushima ............ C09K 5/045

FOREIGN PATENT DOCUMENTS

WO          2015/115252          8/2015
WO          2015/141678          9/2015

OTHER PUBLICATIONS

Understanding Global Warming Potentials Webpage (United States Environmental Protection Agency, https://19january2017snapshot. epa.gov/ghgemissions/understanding-global-warming-potentials_. html, snapshot taken Jan. 19, 2017) (Year: 2017).*

(Continued)

*Primary Examiner* — Matthew R Diaz
(74) *Attorney, Agent, or Firm* — Wenderoth, Lind & Ponack, L.L.P.

(57)          ABSTRACT

An object of the present invention is to provide a novel mixed refrigerant having a low GWP. To achieve the above object, the present invention provides a composition comprising a refrigerant, the refrigerant comprising trans-1,2-difluoroethylene (HFO-1132(E)), trifluoroethylene (HFO-1123), and trans-1,3,3,3-tetrafluoropropene (R1234ze(E)).

9 Claims, 6 Drawing Sheets

(58) Field of Classification Search
CPC ............ C09K 2205/22; C09K 2205/32; C09K
2205/34; C09K 2205/40; F25B 13/00
See application file for complete search history.

(56) References Cited

OTHER PUBLICATIONS

International Preliminary Report on Patentability issued Dec. 21, 2021 in International (PCT) Application No. PCT/JP2020/024157.
Extended European search report issued Aug. 11, 2023 in European Patent Application No. 20827347.4.
International Search Report issued Sep. 8, 2020 in International (PCT) Application No. PCT/JP2020/024157.

* cited by examiner

Fig. 1

COMPOSITION CONTAINING REFRIGERANT, USE OF SAME, REFRIGERATOR HAVING SAME, AND METHOD FOR OPERATING SAID REFRIGERATOR

TECHNICAL FIELD

The present disclosure relates to a composition comprising a refrigerant, use of the composition, a refrigerating machine having the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$: HFC-32 or R32) and pentafluoroethane ($C_2HF_5$: HFC-125 or R125), and is a pseudo-azeotropic composition.

However, the global warming potential (GWP) of R410A is 2088. Due to growing concerns about global warming, R32, which has a GWP of 675, has been increasingly used.

For this reason, various low-GWP mixed refrigerants that can replace R410A have been proposed (PTL 1).

CITATION LIST

Patent Literature

PTL 1: WO2015/141678

SUMMARY

A composition comprising a refrigerant, the refrigerant comprising trans-1,2-difluoroethylene (HFO-1132 (E)), trifluoroethylene (HFO-1123), and trans-1,3,3,3-tetrafluoropropene (R1234ze(E)).

Advantageous Effects

The refrigerant according to the present disclosure can be used as a novel low-GWP mixed refrigerant.

BRIEF DESCRIPTION OF DRAWINGS

FIG. 1 is a schematic view of an apparatus used in a flammability test.

DESCRIPTION OF EMBODIMENTS

Figure 2:
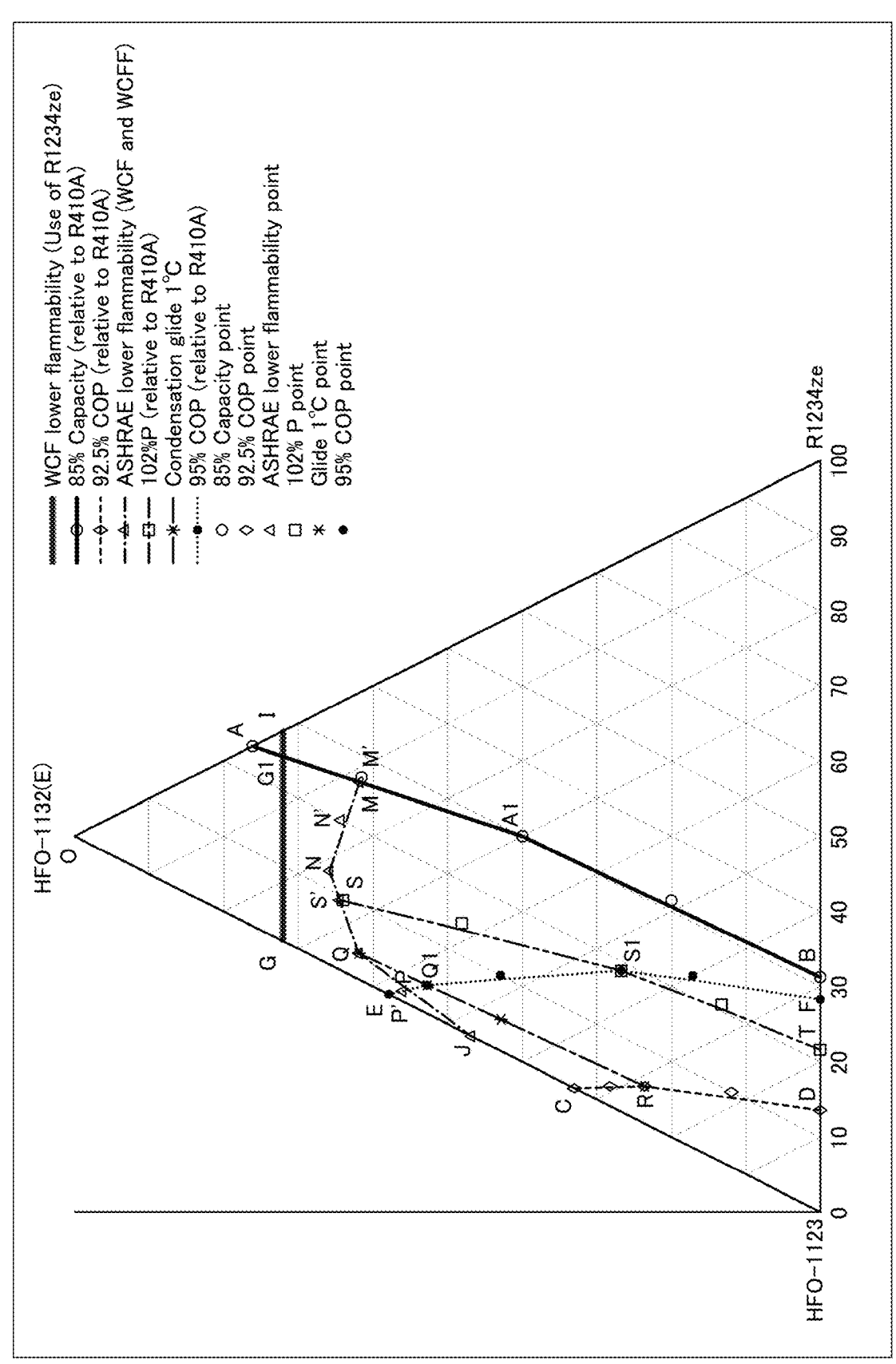
FIG. 2 is a diagram in which a figure defining the refrigerant of the present disclosure is shown in a ternary composition diagram in which the sum of HFO-1132(E), HFO-1123, and R1234ze(E) is 100 mass %.
Figure 3:
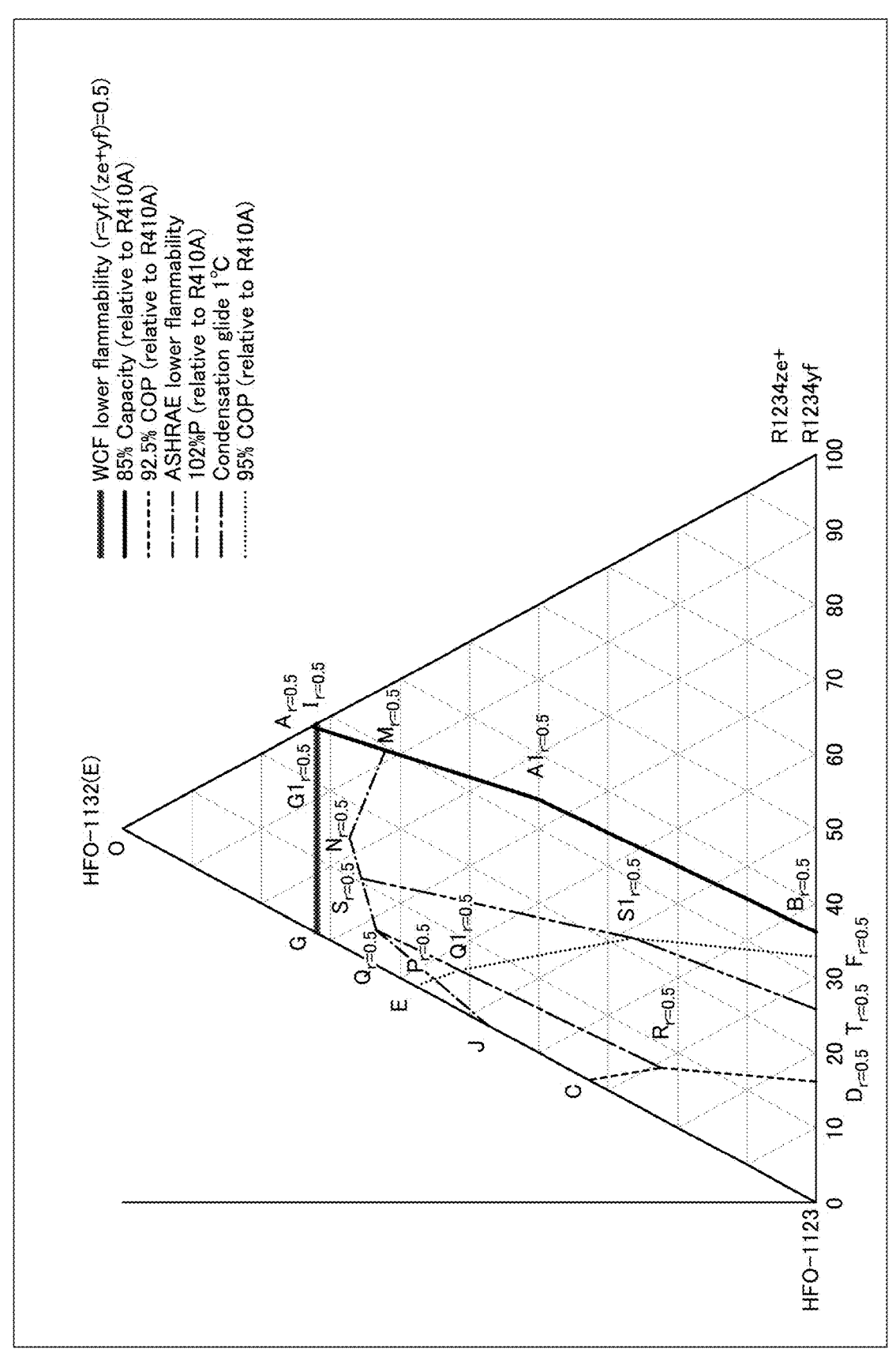
FIG. 3 is a diagram in which a figure defining the refrigerant of the present disclosure wherein the ratio r of R1234yf when the sum of R1234yf and R1234ze(E) is 1 is 0.5 is shown in a ternary composition diagram in which the sum of HFO-1132(E), HFO-1123, and R1234ze(E) and HFO-1234yf is 100 mass %.
Figure 4:
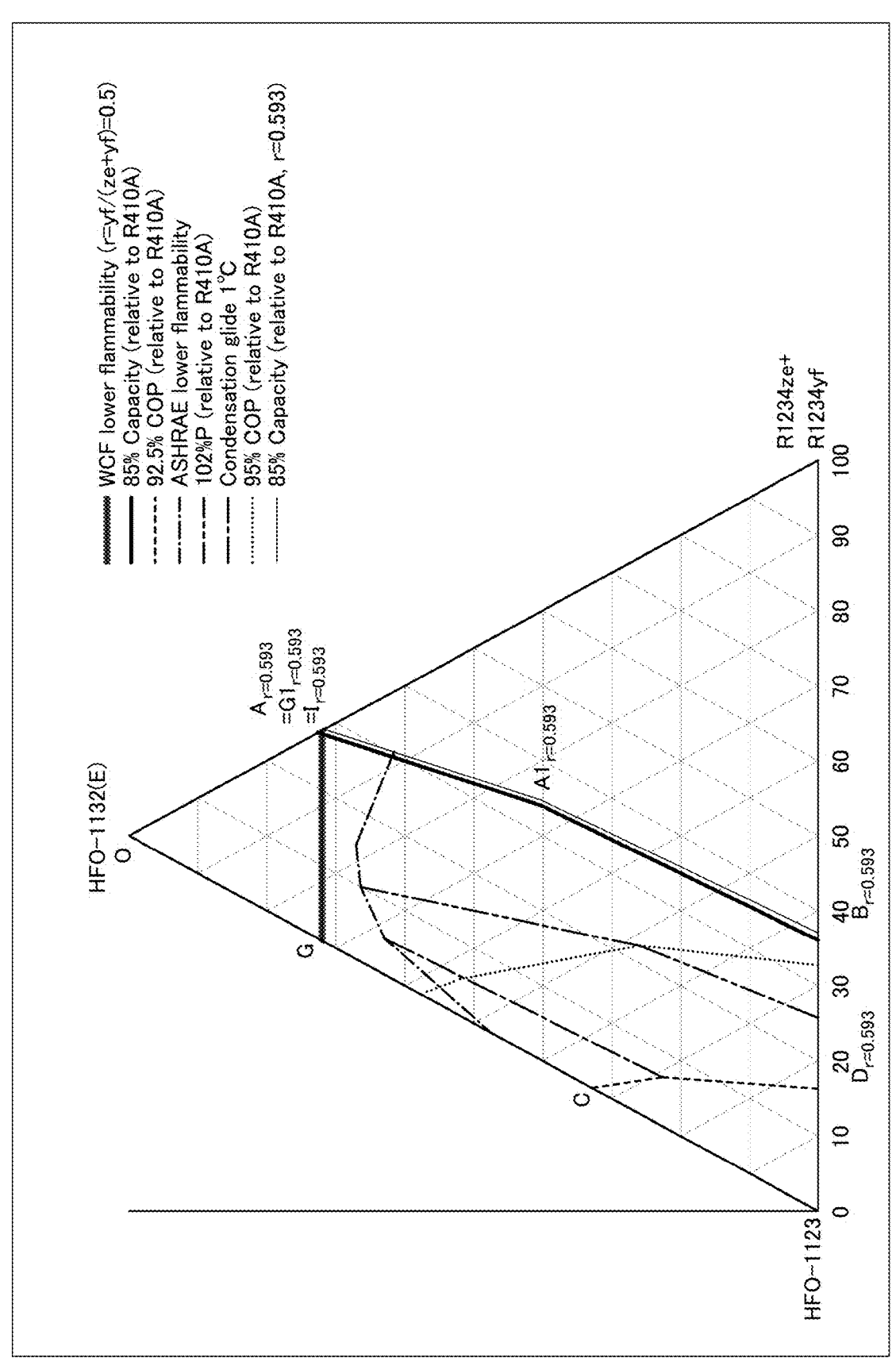
FIG. 4 is a diagram in which a figure defining the refrigerant of the present disclosure wherein the ratio r of R1234yf when the sum of R1234yf and R1234ze(E) is 1 is 0.593 is shown in a ternary composition diagram in which the sum of HFO-1132(E), HFO-1123, and R1234ze(E) and HFO-1234yf is 100 mass %.
Figure 5:
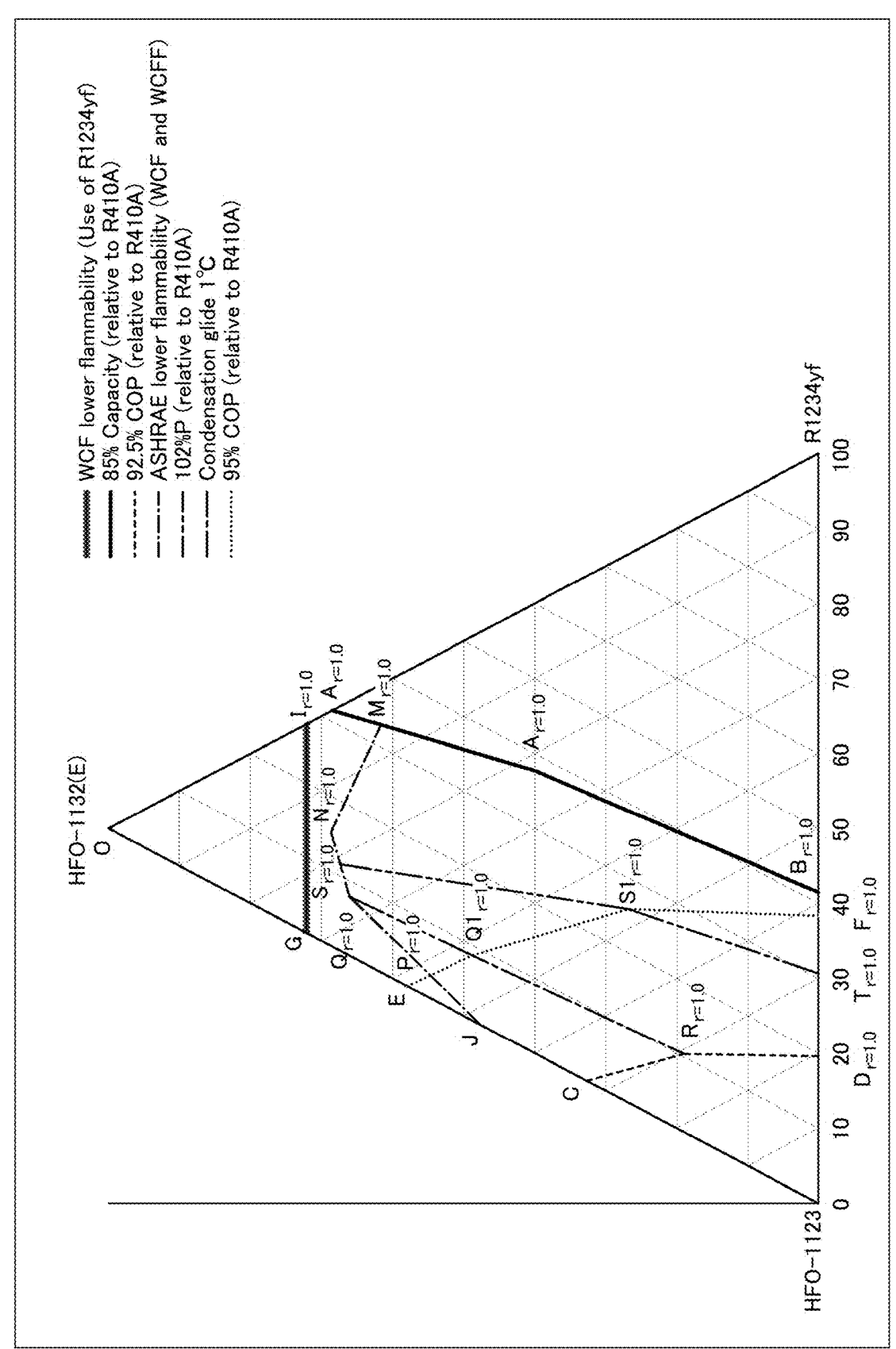
FIG. 5 is a diagram in which a figure defining the refrigerant of the present disclosure wherein the ratio r of R1234yf when the sum of R1234yf and R1234ze(E) is 1 is 1 is shown in a ternary composition diagram in which the sum of HFO-1132 (E), HFO-1123, and R1234ze(E) and HFO-1234yf is 100 mass %.
Figure 6:
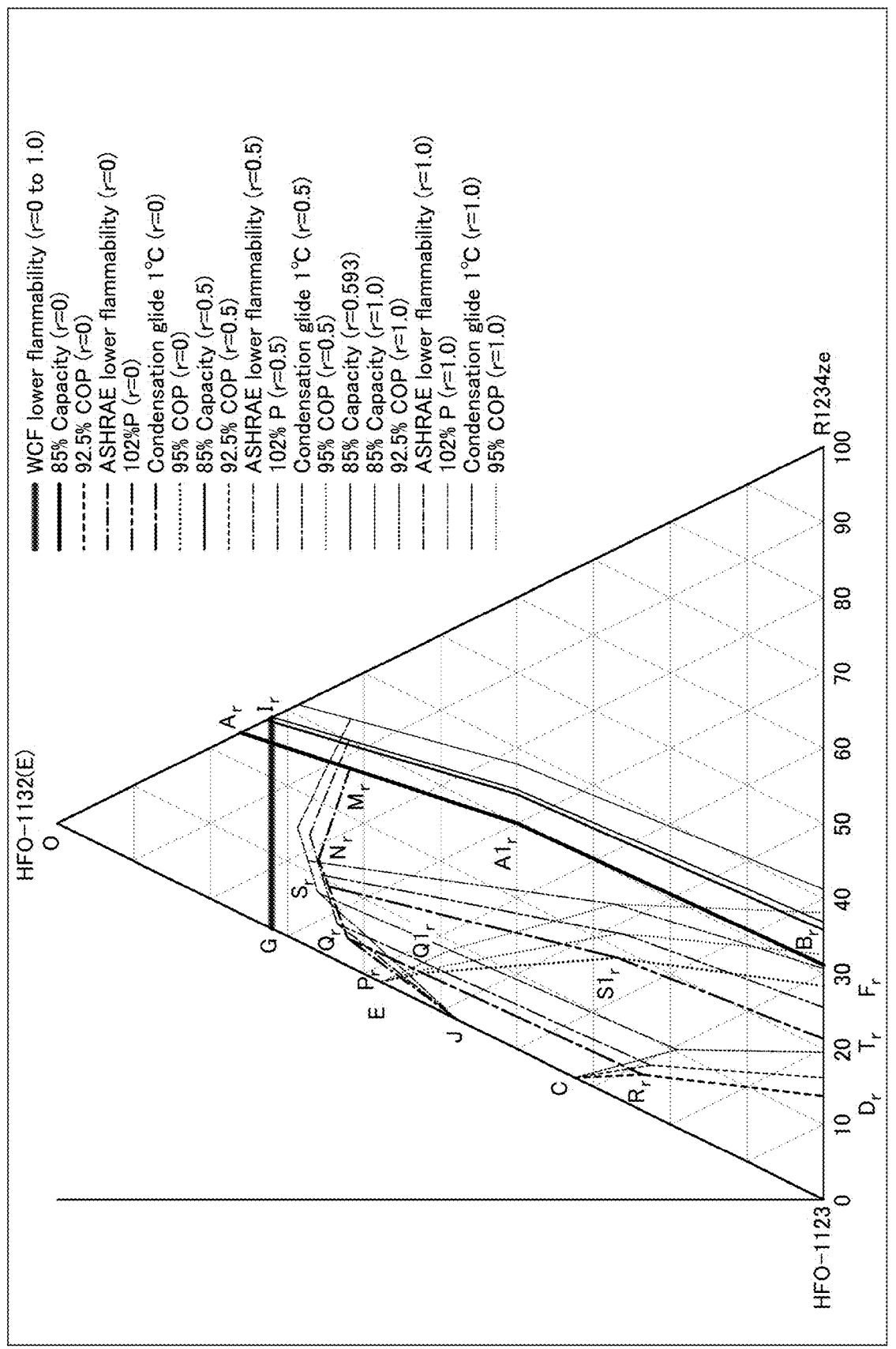
FIG. 6 is a diagram in which a figure defining the refrigerant of the present disclosure wherein the ratio r of R1234yf when the sum of R1234yf and R1234ze(E) is 1 is 0, 0.5, 0.593, and 1 is shown in a ternary composition diagram in which the sum of HFO-1132(E), HFO-1123, and R1234ze(E) and HFO-1234yf is 100 mass %.

The present inventors conducted extensive studies to solve the above problem, and consequently found that a mixed refrigerant comprising trans-1,2-difluoroethylene (HFO-1132 (E)), trifluoroethylene (HFO-1123), and trans-1,3,3,3-tetrafluoro-1-propene (R1234ze(E)) has the above properties.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having "WCF lower flammability" means that the most flammable composition (worst case of formulation for flammability: WCF) has a burning velocity of 10 cm/s or less according to U.S. ANSI/ASHRAE Standard 34-2013. Further, in the present specification, a refrigerant having "ASHRAE lower flammability" means that the burning velocity of WCF is 10 cm/s or less; that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less; and that the flammability classification according to U.S. ANSI/ASHRAE Standard 34-2013 is determined to be classified as "Class 2L."

In the present specification, the term "temperature glide" means an absolute value of the difference between the starting temperature and the ending temperature of the phase change process of the composition comprising a refrigerant according to the present disclosure in the heat exchanger of a refrigerant system.

1. Refrigerant 1.1 Refrigerant Component

The refrigerant according to the present disclosure is a mixed refrigerant comprising trans-1,2-difluoroethylene (HFO-1132(E)), trifluoroethylene (HFO-1123), and trans-1,3,3,3-tetrafluoropropene (R1234ze(E)).

The refrigerant according to the present disclosure has a low GWP.

The refrigerant according to the present disclosure is preferably a refrigerant in which when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments AA1, A1B, BD, DR, RC, CO, and OA that connect the following 7 points:

point A (76.2, 0.0, 23.8),
point A1 (40.0, 30.0, 30.0),
point B (0.0, 68.8, 31.2),
point D (0.0, 86.3, 13.7),
point R (23.7, 71.3, 5.0),
point C (32.9, 67.1, 0.0), and
point O (100.0, 0.0, 0.0), or on these line segments (excluding the points on the line segments BD, CO, and OA);
    the line segments AA1, A1B, BD, CO, and OA are straight lines, the points on the line segment DR are represented by (x, $0.0057x^2-0.7688x+86.3$, $-0.0057x^2-0.2312x+13.7$), and the points on the line segment RC are represented by (x, $0.00945x^2-0.9915x+89.489$, $-0.00945x^2-0.0085x+10.511$). When the requirements above are satisfied, the refrigerant according to the present disclosure has a refrigerating capacity ratio of 85% or more relative to that of R410A, and a COP ratio of 92.5% or more relative to that of R410A.

The refrigerant of the present disclosure is preferably a refrigerant in which when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132 (E), HFO-1123, and R1234ze(E) is 100 mass % are within the range of a figure surrounded by line segments GG1, G1A1, A1B, BD, DR, RC, and CG that connect the following 7 points:

point G (72.0, 28.0, 0.0),
point G1 (72.0, 3.3, 24.7),
point A1 (40.0, 30.0, 30.0),
point B (0.0, 68.8, 31.2),
point D (0.0, 86.3, 13.7),
point R (23.7, 71.3, 5.0), and
point C (32.9, 67.1, 0.0), or on these line segments (excluding the points on the line segments BD and CG);
    the line segments GG1, G1A1, A1B, BD, and CG are straight lines,
    the points on the line segment DR are represented by (x, $0.0057x^2-0.7688x+86.3$, $-0.0057x^2-0.2312x+13.7$), and
    the points on the line segment RC are represented by (x, $0.00945x^2-0.9915x+89.489$, $-0.00945x^2-0.0085x+10.511$). When the requirements above are satisfied, the refrigerant according to the present disclosure has a refrigerating capacity ratio of 85% or more relative to that of R410, and a COP ratio of 92.5% or more relative to that of R410A. Furthermore, the refrigerant has a WCF lower flammability according to the ASHRAE Standard (the WCF composition has a burning velocity of 10 cm/s or less).

The refrigerant according to the present disclosure is preferably a refrigerant in which when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by line segments JQ, QN, NM, MA1, A1B, BD, DR, RC, and CJ that connect the following 9 points:

point J (47.1, 52.9, 0.0),
point Q (62.1, 34.5, 3.4),
point N (65.9, 21.6, 12.5),
point M (61.9, 11.9, 26.2),
point A1 (40.0, 30.0, 30.0),
point B (0.0, 68.8, 31.2),
point D (0.0, 86.3, 13.7),
point R (23.7, 71.3, 5.0), and
point C (32.9, 67.1, 0.0), or on these line segments (excluding the points on the line segments BD and CJ);
    the line segments JQ, QN, NM, MA1, A1B, BD, and CJ are straight lines,
    the points on the line segment DR are represented by (x, $0.0057x^2-0.7688x+86.3$, $-0.0057x^2-0.2312x+13.7$), and the points on the line segment RC are represented by (x, $0.00945x^2-0.9915x+89.489$, $-0.00945x^2-0.0085x+10.511$). When the requirements above are satisfied, the refrigerant according to the present disclosure has a refrigerating capacity ratio of 85% or more relative to that of R410A, and a COP ratio of 92.5% or more relative to that of R410A. Furthermore, the refrigerant has a lower flamnability (2L class) according to the ASHRAE Standard (the WCF composition and the WCFF composition have a burning velocity of 10 cm/s or less).

The refrigerant according to the present disclosure is a refrigerant in which when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments JQ, QR, RC, and CJ that connect the following 4 points:

point J (47.1, 52.9, 0.0),
point Q (62.1, 34.5, 3.4),
point R (23.7, 71.3, 5.0), and
point C (32.9, 67.1, 0.0), or on these line segments (excluding the points on the line segment CJ);
    the line segments JQ, QR, and CJ are straight lines, and
    the points on the line segment RC are represented by (x, $0.00945x^2-0.9915x+89.489$, $-0.00945x^2-0.0085x+10.511$). When the requirements above are satisfied, the refrigerant according to the present disclosure has a refrigerating capacity ratio of 85% or more relative to that of R410A, and a COP ratio of 92.5% or more relative to that of R410A. Furthermore, the refrigerant has a condensation temperature glide of 1° C. or less.

The refrigerant according to the present disclosure is preferably a refrigerant in which when the mass % of HFO-1132 (E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments SN, NM, MA1, A1B, BF, FS1, and S1S that connect the following 7 points:

point S (64.6, 26.0, 9.4),
point N (65.9, 21.6, 12.5),
point M (61.9, 11.9, 26.2),
point A1 (40.0, 30.0, 30.0),
point B (0.0, 68.8, 31.2),
point F (0.0, 71.7, 28.3), and
point S1 (26.8, 54.4, 18.8), or on these line segments;
    the line segments SN, NM, MA1, A1B, and BF are straight lines,
    the line segment FS1 is represented by (x, $0.0041x^2-0.7562x+71.7$, $-0.0041x^2-0.2438x+28.3$), and
    the line segment S1S is represented by (x, $0.00155x^2-0.8939x+77.236$, $-0.00155x^2-0.1061x+22.764$). When the requirements above are satisfied, the refrigerant according to the present disclosure has a refrigerating capacity ratio of 85% or more relative to that of R410A, and a COP ratio of 95% or more relative to that of R410A. Furthermore, the refrigerant has a discharge pressure ratio of 102% or less relative to that of R410A.

The refrigerant according to the present disclosure is preferably a refrigerant in which when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by straight lines P'Q, QQ1, and Q1P' that connect the following 3 points:

point P (55.4, 42.7, 1.9),
point Q (62.1, 34.5, 3.4), and
point Q1 (52.8, 43.5, 3.7), or on these line segments. When the requirements above are satisfied, the refrigerant according to the present disclosure has a refrigerating capacity ratio of 85% or more relative to that of R410A, and a COP ratio of 95% or more relative to that of R410A. Furthermore, the refrigerant has a condensation temperature glide of 1° C. or less.

The refrigerant according to the present disclosure may further comprise 2,3,3,3-tetrafluoro-1-propene (R1234yf).

When the refrigerant according to the present disclosure further comprises R1234yf, it is preferably a refrigerant in which when the mass % of HFO-1132(E) is x, the mass % of HFO-1123 is y, and the mass % of the sum of R1234ze(E) and R1234yf is z', based on the sum of HFO-1132(E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze (E) and R1234yf is 100 mass %, as vertices, are within the range of a figure surrounded by straight lines $A_rA1_r$, $A1_rB_r$, $B_rD_r$, $D_rR_r$, $R_rC$, CO, and $OA_r$ that connect the following 7 points:

point $A_r$ ($-1.6r^2-6.0r+76.2$, 0.0, 100.0–x),
point $A1_r$ (40.0, $-0.4r^2-7.4r+30.0$, 60.0–y),
point $B_r$ (0.0, $-1.0r^2-9.1r+68.8$, 100.0–y),
point $D_r$ (0.0, $-1.8r^2-4.1r+86.3$, 100.0–y),
point $R_r$ ($-4.6r^2-0.5r+23.7$, 100.0–x–z, $4.0r^2+1.6r+5.0$),
point C (32.9, 67.1, 0.0), and
point O (100.0, 0.0, 0.0), or on these line segments (excluding the points on the line segments $B_rD_r$, CO, and $OA_r$). When the requirements above are satisfied, the refrigerant according to the present disclosure has a refrigerating capacity ratio of 85% or more relative to that of R410A, and a COP ratio of 92.5% or more relative to that of R410A.

When the refrigerant according to the present disclosure further comprises R1234yf, it is preferably a refrigerant in which when the mass % of HFO-1132(E) is x, the mass % of HFO-1123 is y, and the mass % of the sum of R1234ze(E) and R1234yf is z', based on the sum of HFO-1132(E), HFO-1123, R1234ze(E), and R1234yf, and when the ratio of R1234yf in the case in which the sum of R1234yf and R1234ze(E) is 1 is r (0<r<1),
if 0.53≥r>0,
    coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines GG1, $G1_rA1_r$, $A1_rB_r$, $B_rD_r$, $D_rR_r$, $R_rC$, and CG that connect the following 7 points:

point G (72.0, 28.0, 0.0),
point $G1_r$ (72.0, $1.7734r^2+4.5133r+24.7$, 28.0–y),
point $A1_r$ (40.0, $-0.4r^2-7.4r+30.0$, 60.0–y),
point $B_r$ (0.0, $-1.0r^2-9.1r+68.8$, 100.0–y),
point $D_r$ (0.0, $-1.8r^2-4.1r+86.3$, 100.0–y),
point $R_r$ ($-4.6r^2-0.5r+23.7$, 100.0–x–z, $4.0r^2+1.6r+5.0$), and
point C (32.9, 67.1, 0.0), or on the line segments (excluding the points on the line segments $B_rD_r$ and CG);

if 1.0>r>0.53,
coordinates (x,y,z) in the ternary composition diagram are within the range of a figure surrounded by straight lines GI, $IA_r$, $A_rA1_r$, $A1_rB_r$, $B_rD_r$, $D_rR_r$, $R_rC$, and CG that connect the following 8 points:
point G (72.0, 28.0, 0.0),
point I (72.0, 0.0, 28.0),
point $A_r$ ($-1.6r^2-6.0r+76.2$, 0.0, 100.0−x),
point $A1_r$(40.0, $-0.4r^2-7.4r+30.0$, 60.0−y),
point $B_r$ (0.0, $-1.0r^2-9.1r+68.8$, 100.0−y),
point $D_r$ (0.0, $-1.8r^2-4.1r+86.3$, 100.0−y),
point $R_r$ ($-4.6r^2-0.5r+23.7$, 100.0−x−z, $4.0r^2+1.6r+5.0$), and
point C (32.9, 67.1, 0.0), or on these line segments (excluding the points on the line segments $IA_r$, $B_rD_r$, and CG). When the requirements above are satisfied, the refrigerant according to the present disclosure has a refrigerating capacity ratio of 85% or more relative to that of R410A, and a COP ratio of 92.5% or more relative to that of R410A. Furthermore, the refrigerant has a WCF lower flammability according to the ASHRAE Standard (the WCF composition has a burning velocity of 10 cm/s or less).

When the refrigerant according to the present disclosure further comprises R1234yf, it is preferably a refrigerant in which when the mass % of HFO-1132(E) is x, the mass % of HFO-1123 is y, and the mass % of the sum of R1234ze(E) and R1234yf is z', based on the sum of HFO-1132(E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze (E) and R1234yf is 100 mass %, as vertices, are within the range of a figure surrounded by straight lines $JQ_r$, $Q_rN_r$, $N_rM_r$, $M_rA1_r$, $A1_rB_r$, $B_rD_r$, $D_rR_r$, $R_rC$, and CJ that connect the following 9 points:
point J (47.1, 52.9, 0.0),
point $Q_r$ ($2.6r^2+1.3r+62.1$, $-5.8r^2-2.5r+34.5$, 100.0−x−y),
point $S1_r$ (100.0−y−z, $-3.8r^2-3.5r+54.4$, $0.2r^2+6.7r+18.8$),
point $N_r$ ($-0.2r^2+2.9r+65.9$, $4.8r^2-10.2r+21.6$, 100.0−x−y),
point $M_r$ (100.0−y−z, $1.0r^2-7.5r+11.9$, $0.8r^2+6.0r+26.2$),
point $A1_r$ (40.0, $-0.4r^2-7.4r+30.0$, 60.0−y),
point $B_r$ (0.0, $-1.0r^2-9.1r+68.8$, 100.0−y),
point $D_r$ (0.0, $-1.8r^2-4.1r+86.3$, 100.0−y),
point $R_r$ ($-4.6r^2-0.5r+23.7$, 100.0−x−z, $4.0r^2+1.6r+5.0$), and
point C (32.9, 67.1, 0.0), or on these line segments (excluding the points on the line segments BD and CJ). When the requirements above are satisfied, the refrigerant according to the present disclosure has a refrigerating capacity ratio of 85% or more relative to that of R410, and a COP ratio of 92.5% or more relative to that of R410A. Furthermore, the refrigerant has a lower flammability (2L class) according to the ASHRAE Standard (the WCF composition and the WCFF composition have a burning velocity of 10 cm/s or less).

When the refrigerant according to the present disclosure further comprises R1234yf, it is preferably a refrigerant in which when the mass % of HFO-1132(E) is x, the mass % of HFO-1123 is y, and the mass % of the sum of R1234ze(E) and R1234yf is z', based on the sum of HFO-1132(E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze (E) and R1234yf is 100 mass %, as vertices, are within the range of a figure surrounded by straight lines $JQ_r$, $Q_rR_r$, $R_rC$, and CJ that connect the following 4 points:
point J (47.1, 52.9, 0.0),
point $Q_r$ ($2.6r^2+1.3r+62.1$, $-5.8r^2-2.5r+34.5$, 100.0−x−y),
point $R_r$ ($-4.6r^2-0.5r+23.7$, 100.0−x−z, $4.0r^2+1.6r+5.0$), and
point C (32.9, 67.1, 0.0), or on these line segments (excluding the points on the line segment CJ). When the requirements above are satisfied, the refrigerant according to the present disclosure has a refrigerating capacity ratio of 85% or more relative to that of R410A, and a COP ratio of 92.5% or more relative to that of R410A. Furthermore, the refrigerant has a lower flammability (2L class) according to the ASHRAE Standard (the WCF composition and the WCFF composition have a burning velocity of 10 cm/s or less); moreover, the refrigerant has a condensation temperature glide of 1° C. or less.

When the refrigerant according to the present disclosure further comprises R1234yf, it is preferably a refrigerant in which when the mass % of HFO-1132(E) is x, the mass % of HFO-1123 is y, and the mass % of the sum of R1234ze(E) and R1234yf is z', based on the sum of HFO-1132(E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze (E) and R1234yf is 100 mass %, as vertices, are within the range of a figure surrounded by straight lines $S_rN_r$, $N_rM_r$, $M_rA1_r$, $A1_rB_r$, $B_rF_r$, $F_rS1_r$, and $S1_rS_r$ that connect the following 7 points:
point $S_r$ ($1.4r^2+1.3r+64.6$, $-0.8r^2-4.0r+26.0$, 100.0−x−y),
point $N_r$ ($-0.2r^2+2.9r+65.9$, $4.8r^2-10.2r+21.6$, 100.0−x−y),
point $M_r$ (100.0−y−z, $1.0r^2-7.5r+11.9$, $0.8r^2+6.0r+26.2$),
point $A1_r$ (40.0, $-0.4r^2-7.4r+30.0$, 60.0−y),
point $B_r$ (0.0, $-1.0r^2-9.1r+68.8$, 100.0−y),
point $F_r$ (0.0, $-2.6r^2-7.3r+71.7$, 100.0−y), and
point $S1_r$ (100.0−y−z, $-3.8r^2-3.5r+54.4$, $0.2r^2+6.7r+18.8$), or on these line segments (excluding the points on the line segment $B_rF_r$). When the requirements above are satisfied, the refrigerant according to the present disclosure has a refrigerating capacity ratio of 85% or more relative to that of R410A, and a COP ratio of 95% or more relative to that of R410A. Furthermore, the refrigerant has a lower flammability (2L class) according to the ASHRAE Standard (the WCF composition and the WCFF composition have a burning velocity of 10 cm/s or less); moreover, the refrigerant has a discharge pressure ratio of 102% or less relative to that of R410A.

When the refrigerant according to the present disclosure further comprises R1234yf, it is preferably a refrigerant in which when the mass % of HFO-1132(E) is x, the mass % of HFO-1123 is y, and the mass % of the sum of R1234ze(E) and R1234yf is z', based on the sum of HFO-1132(E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze (E) and R1234yf is 100 mass %, as vertices, are within the range of a figure surrounded by straight lines $P_rQ_r$, $Q_rQ1_r$, and $Q1_rP_r$ that connect the following 3 points:
point $P_r$ ($-0.2r^2-0.5r+55.4$, 100.0−x−z, $0.6r^2+0.7r+1.9$),
point $Q_r$ ($2.6r^2+1.3r+62.1$, $-5.8r^2-2.5r+34.5$, 100.0−x−y), and point $Q1_r$ (−2.4r$^2$−0.8r+52.8, 100.0−x−z, 3.6r$^2$+0.8r+3.7), or on these line segments. When the requirements above are satisfied, the refrigerant according to the present disclosure has a refrigerating capacity ratio of 85% or more relative to that of R410A, and a COP ratio of 95% or more relative to that of R410A. Furthermore, the refrigerant has a lower flammability (2L class) according to the ASHRAE Standard (the WCF composition and the WCFF composition have a burning velocity of 10 cm/s or less); moreover, the refrigerant has a condensation temperature glide of 1° C. or less.

In all of the above embodiments, the refrigerant according to the present disclosure may comprise R1234ze(E) in an amount of more than 0 mass %, 0.5 mass % or more, 1 mass % or more, 3 mass % or more, 10 mass % or more, and 15 mass % or more relative to the entire refrigerant.

In all of the above embodiments, the refrigerant according to the present disclosure may comprise R1234yf in an amount of more than 0 mass %, 0.5 mass % or more, 1 mass % or more, 3 mass % or more, 10 mass % or more, and 15 mass % or more relative to the entire refrigerant.

In all of the above embodiments, the refrigerant according to the present disclosure may comprise R1234yf in an amount of more than 0 mass % and 0.5 mass % or less relative to the entire refrigerant.

In all of the above embodiments, the refrigerant according to the present disclosure may comprise the sum of R1234ze (E) and R1234yf in an amount of 1 mass % or more, 3 mass % or more, 10 mass % or more, or 15 mas % or more, relative to the entire refrigerant.

The refrigerant according to the present disclosure may further comprise other additional refrigerant(s) in addition to HFO-1132(E), HFO-1123, R1234ze(E), and R1234yf. In this respect, the refrigerant according to the present disclosure preferably comprises the sum of HFO-1132(E), HFO-1123, R1234ze(E), and R1234yf in an amount of 99.5 mass % or more, more preferably 99.75 mass % or more, even more preferably 99.9 mass % or more, still more preferably 99.99 mass % or more, and most preferably 99.999 mass % or more relative to the entire refrigerant.

The refrigerant according to the present disclosure may consist of HFO-1132(E), HFO-1123, R1234ze(E), and R1234yf.

Such additional refrigerants are not limited, and can be selected from a wide range of refrigerants. The mixed refrigerant may comprise a single additional refrigerant, or two or more additional refrigerants.

1.2. Use

The refrigerant according to the present disclosure can be preferably used as a working fluid in a refrigerating machine.

The refrigerant according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2{=}CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)

HFE-236fa (trifluoromethyl-trifluoroethyl ether, $CF_3OCH_2CF_3$)

The refrigerant composition according to the present disclosure may contain one or more tracers at a total concentration of about 10 parts per million by weight (ppm) to about 1000 ppm based on the entire refrigerant composition. The refrigerant composition according to the present disclosure may preferably contain one or more tracers at a total concentration of about 30 ppm to about 500 ppm, and more preferably about 50 ppm to about 300 ppm, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1. Refrigeration Oil

The refrigeration oil-containing working fluid according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises the step of circulating the refrigerant according to the present disclosure in a refrigerating machine.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132 (E)), trifluoroethylene (HFO-1123), and trans-1,3,3,3-tetrafluoropropene (R1234ze(E)).

Item 2.

The composition according to Item 1, wherein when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments AA1, A1B, BD, DR, RC, CO, and OA that connect the following 7 points:

point A (76.2, 0.0, 23.8), point A1 (40.0, 30.0, 30.0), point B (0.0, 68.8, 31.2), point D (0.0, 86.3, 13.7), point R (23.7, 71.3, 5.0), point C (32.9, 67.1, 0.0), and point O (100.0, 0.0, 0.0), or on these line segments (excluding the points on the line segments BD, CO, and OA);

the line segments AA1, A1B, BD, CO, and OA are straight lines, the points on the line segment DR are represented by (x, $0.0057x^2-0.7688x+86.3$, $-0.0057x^2-0.2312x+13.7$), and the points on the line segment RC are represented by (x, $0.00945x^2-0.9915x+89.489$, $-0.00945x^2-0.0085x+10.511$).

Item 3.

The composition according to Item 1, wherein when the mass % of HPO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments GG1, G1A1, A1B, BD, DR, RC, and CG that connect the following 7 points:

point G (72.0, 28.0, 0.0), point G1 (72.0, 3.3, 24.7), point A1 (40.0, 30.0, 30.0), point B (0.0, 68.8, 31.2), point D (0.0, 86.3, 13.7), point R (23.7, 71.3, 5.0), and point C (32.9, 67.1, 0.0), or on these line segments (excluding the points on the line segments BD and CG);

the line segments GG1, G1A1, A1B, BD, and CG are straight lines, the points on the line segment DR are represented by (x, $0.0057x^2-0.7688x+86.3$, $-0.0057x^2-0.2312x+13.7$), and the points on the line segment RC are represented by (x, $0.00945x^2-0.9915x+89.489$, $-0.00945x^2-0.0085x+10.511$).

Item 4.

The composition according to Item 1, wherein when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments JQ, QN, NM, MA1, A1B, BD, DR, RC, and CJ that connect the following 9 points:

point J (47.1, 52.9, 0.0), point Q (62.1, 34.5, 3.4), point N (65.9, 21.6, 12.5), point M (61.9, 11.9, 26.2), point A1 (40.0, 30.0, 30.0), point B (0.0, 68.8, 31.2), point D (0.0, 86.3, 13.7), point R (23.7, 71.3, 5.0), and point C (32.9, 67.1, 0.0), or on these line segments (excluding the points on the line segments BD and CJ);

the line segments JQ, QN, NM, MA1, A1B, BD, and CJ are straight lines, the points on the line segment DR are represented by (x, $0.0057x^2-0.7688x+86.3$, $-0.0057x^2-0.2312x+13.7$), and the points on the line segment RC are represented by (x, $0.00945x^2-0.9915x+89.489$, $-0.00945x^2-0.0085x+10.511$).

Item 5.

The composition according to Item 1, wherein when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments JQ, QR, RC, and CJ that connect the following 4 points:

point J (47.1, 52.9, 0.0), point Q (62.1, 34.5, 3.4), point R (23.7, 71.3, 5.0), and point C (32.9, 67.1, 0.0), or on these line segments (excluding the points on the line segment CJ);

the line segments JQ, QR, and CJ are straight lines, and the points on the line segment RC are represented by (x, $0.00945x^2-0.9915x+89.489$, $-0.00945x^2-0.0085x+10.511$).

Item 6.

The composition according to Item 1, wherein when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments SN, NM, MA1, A1B, BF, FS1, and S1S that connect the following 7 points:

point S (64.6, 26.0, 9.4), point N (65.9, 21.6, 12.5), point M (61.9, 11.9, 26.2), point A1 (40.0, 30.0, 30.0), point B (0.0, 68.8, 31.2), point F (0.0, 71.7, 28.3), and point S1 (26.8, 54.4, 18.8), or on these line segments;

the line segments SN, NM, MA1, A1B, and BF are straight lines, the line segment FS1 is represented by (x, $0.0041x^2-0.7562x+71.7$, $-0.0041x^2-0.2438x+28.3$), and the line segment S1S is represented by (x, $0.00155x^2-0.8939x+77.236$, $-0.00155x^2-0.1061x+22.764$).

Item 7.

The composition according to Item 1, wherein when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by straight lines P'Q, QQ1, and Q1P' that connect the following 3 points:

point P (55.4, 42.7, 1.9), point Q (62.1, 34.5, 3.4), and point Q1 (52.8, 43.5, 3.7), or on these line segments.

Item 8.

The composition according to Item 1, further comprising 2,3,3,3-tetrafluoro-1-propene (R1234yf).

Item 9.

The composition according to Item 1, further comprising R1234yf, wherein when the mass % of HFO-1132(E) is x, the mass % of HFO-1123 is y, and the mass % of the sum of R1234ze (E) and R1234yf is z', based on the sum of HFO-1132 (E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines $A_rA1_r$, $A1_rB_r$, $B_rD_r$, $D_rR_r$, $R_rC$, CO, and $OA_r$, that connect the following 7 points:

point $A_r$ ($-1.6r^2-6.0r+76.2$, 0.0, 100.0−x), point $A1_r$ (40.0, $-0.4r^2-7.4r+30.0$, 60.0−y), point $B_r$ (0.0, $-1.0r^2-9.1r+68.8$, 100.0−y), point $D_r$ (0.0, $-1.8r^2-4.1r+86.3$, 100.0−y), point $R_r$ ($-4.6r^2-0.5r+23.7$, 100.0−x−z, $4.0r^2+1.6r+5.0$), point C (32.9, 67.1, 0.0), and point O (100.0, 0.0, 0.0), or on these line segments (excluding the points on the line segments $B_rD_r$, CO, and $OA_r$).

Item 10.

The composition according to Item 1, further comprising R1234yf, wherein when the mass % of HFO-1132(E) is x, the mass % of HFO-1123 is y, and the mass % of the sum of R1234ze (E) and R1234yf is z', based on the sum of HFO-1132 (E), HFO-1123, R1234ze(E), and R1234yf, and when the ratio of R1234yf in the case in which the sum of R1234yf and R1234ze(E) is 1 is r (0<r<1), if 0.53≥r>0, coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines GG1, $G1_rA1$, $A1_rB_r$, $B_rD_r$, $D_rR_r$, $R_rC$, and CG that connect the following 7 points:

point G (72.0, 28.0, 0.0), point G1r (72.0, $1.7734r^2+4.5133r+24.7$, 28.0−y), point $A1_r$ (40.0, $-0.4r^2-7.4r+30.0$, 60.0−y), point $B_r$ (0.0, $-1.0r^2-9.1r+68.8$, 100.0−y), point $D_r$ (0.0, $-1.8r^2-4.1r+86.3$, 100.0−y), point $R_r$ ($-4.6r^2-0.5r+23.7$, 100.0−x−z, $4.0r^2+1.6r+5.0$), and point C (32.9, 67.1, 0.0), or on the line segments (excluding the points on the line segments $B_rD_r$ and CG);

if 1.0>r>0.53, coordinates (x,y, z) in the ternary composition diagram are within the range of a figure surrounded by straight lines GI, $IA_r$, $A_rA1_r$, $A1_rB_r$, $B_rD_r$, $D_rR_r$, $R_rC$, and CG that connect the following 8 points:

point G (72.0, 28.0, 0.0), point I (72.0, 0.0, 28.0), point $A_r$ ($-1.6r^2-6.0r+76.2$, 0.0, 100.0−x), point $A1_r$ (40.0, $-0.4r^2-7.4r+30.0$, 60.0−y), point $B_r$ (0.0, $-1.0r^2-9.1r+68.8$, 100.0−y), point $D_r$ (0.0, $-1.8r^2-4.1r+86.3$, 100.0−y), point $R_r$ ($-4.6r^2-0.5r+23.7$, 100.0−x−z, $4.0r^2+1.6r+5.0$), and point C (32.9, 67.1, 0.0), or on these line segments (excluding the points on the line segments $IA_r$, $B_rD_r$, and CG).

Item 11.

The composition according to claim 1, further comprising R1234yf, wherein when the mass % of HFO-1132(E) is x, the mass % of HFO-1123 is y, and the mass % of the sum of R1234ze (E) and R1234yf is z', based on the sum of HFO-1132 (E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines $JQ_r$, $Q_rN_r$, $N_rM_r$, $M_rA1_r$, $A1_rB_r$, $B_rD_r$, $D_rR_r$, $R_rC$, and CJ that connect the following 9 points:

point J (47.1, 52.9, 0.0), point $Q_r$ ($2.6r^2+1.3r+62.1$, $-5.8r^2-2.5r+34.5$, 100.0−x−y), point S1$_r$ (100.0−y−z, $-3.8r^2-3.5r+54.4$, $0.2r^2+6.7r+18.8$), point $N_r$ ($-0.2r^2+2.9r+65.9$, $4.8r^2-10.2r+21.6$, 100.0−x−y), point $M_r$ (100.0−y−z, $1.0r^2-7.5_r+11.9$, $0.8r^2+6.0r+26.2$), point $A1_r$ (40.0, $-0.4r^2-7.4r+30.0$, 60.0−y), point $B_r$ (0.0, $-1.0r^2-9.1r+68.8$, 100.0−y), point $D_r$ (0.0, $-1.8r^2-4.1r+86.3$, 100.0−y), point $R_r$ ($-4.6r^2-0.5r+23.7$, 100.0−x−z, $4.0r^2+1.6r+5.0$), and point C (32.9, 67.1, 0.0), or on these line segments (excluding the points on the line segments BD and CJ).

Item 12.

The composition according to Item 1, further comprising R1234yf, wherein when the mass % of HFO-1132(E) is x, the mass % of HFO-1123 is y, and the mass % of the sum of R1234ze (E) and R1234yf is z', based on the sum of HFO-1132 (E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines $JQ_r$, $Q_rR_r$, $R_rC$, and CJ that connect the following 4 points:

point J (47.1, 52.9, 0.0), point $Q_r$ ($2.6r^2+1.3r+62.1$, $-5.8r^2-2.5r+34.5$, 100.0−x−y), point $R_r$ ($-4.6r^2-0.5r+23.7$, 100.0−x−z, $4.0r^2+1.6r+5.0$), and point C (32.9, 67.1, 0.0), or on these line segments (excluding the points on the line segment CJ).

Item 13.

The composition according to Item 1, further comprising R1234yf, wherein when the mass % of HFO-1132(E) is x, the mass % of HFO-1123 is y, and the mass % of the sum of R1234ze (E) and R1234yf is z', based on the sum of HFO-1132 (E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines $S_rN_r$, $N_rM_r$, $M_rA1_r$, $A1_rB_r$, $B_rF_r$, $F_rS1_r$, and $S1_rS_r$ that connect the following 7 points:

point $S_r$ ($1.4r^2+1.3r+64.6$, $-0.8r^2-4.0r+26.0$, $100.0-x-y$), point $N_r$ ($-0.2r^2+2.9r+65.9$, $4.8r^2-10.2r+21.6$, $100.0-x-y$), point $M_r$ ($100.0-y-z$, $1.0r^2-7.5r+11.9$, $0.8r^2+6.0r+26.2$), point $A1_r$ ($40.0$, $-0.4r^2-7.4r+30.0$, $60.0-y$), point $B_r$ ($0.0$, $-1.0r^2-9.1r+68.8$, $100.0-y$), point $F_r$ ($0.0$, $-2.6r^2-7.3r+71.7$, $100.0-y$), and point $S1_r$ ($100.0-y-z$, $-3.8r^2-3.5r+54.4$, $0.2r^2+6.7r+18.8$), or on these line segments (excluding the points on the line segment $B_rF_r$.)

Item 14.

The composition according to Item 1, further comprising R1234yf, wherein when the mass % of HFO-1132(E) is x, the mass % of HFO-1123 is y, and the mass % of the sum of R1234ze (E) and R1234yf is z', based on the sum of HFO-1132 (E), HFO-1123, R1234ze(E), and R1234yf, and when the ratio of R1234yf in the case in which the sum of R1234yf and R1234ze(E) is 1 is r (0<r<1), coordinates (x, y, z') in a ternary composition diagram having the point in which HFO-1132(E) is 100 mass %, the point in which HFO-1123 is 100 mass %, and the point in which the sum of R1234ze(E) and R1234yf is 100 mass %, as vertices, are within the range of a figure surrounded by straight lines $P_rQ_r$, $Q_rQ1_r$, and $Q1_rP_r$ that connect the following 3 points:

point $P_r$ ($-0.2r^2-0.5r+55.4$, $100.0-x-z$, $0.6r^2+0.7r+1.9$), point $Q_r$ ($2.6r^2+1.3r+62.1$, $-5.8r^2-2.5r+34.5$, $100.0-x-y$), and point $Q1_r$ ($-2.4r^2-0.8r+52.8$, $100.0-x-z$, $3.6r^2+0.8r+3.7$), or on these line segments.

Item 15.

The composition according to any one of Items 1 to 14, for use as a working fluid for a refrigerating machine, wherein the composition further comprises a refrigeration oil.

Item 16.

The composition according to any one of Items 1 to 15, for use as an alternative refrigerant for R410A.

Item 17.

Use of the composition according to any one of Items 1 to 15 as an alternative refrigerant for R410A.

Item 18.

A refrigerating machine comprising the composition according to any one of Items 1 to 15 as a working fluid.

Item 19.

A method for operating a refrigerating machine, comprising the step of circulating the composition according to any one of Items 1 to 15 as a working fluid in a refrigerating machine.

Examples

The present disclosure is described in more detail below with reference to Examples. However, the present disclosure is not limited to the Examples.

R410A (R32=50%/R125=50%), a mixed refrigerant of HFO-1132(E), HFO-1123, and R1234ze(E), and a mixed refrigerant of HFO-1132(E), HFO-1123, R1234ze(E), and R1234yf were evaluated as follows.

The burning velocity of these mixed refrigerants whose mixed formulations were adjusted to WCF concentrations was measured according to ANSI/ASHRAE Standard 34-2013. Compositions having a burning velocity of 10 cm/s or less were determined to be classified as "Class 2L (lower flammability)."

Figure 1:
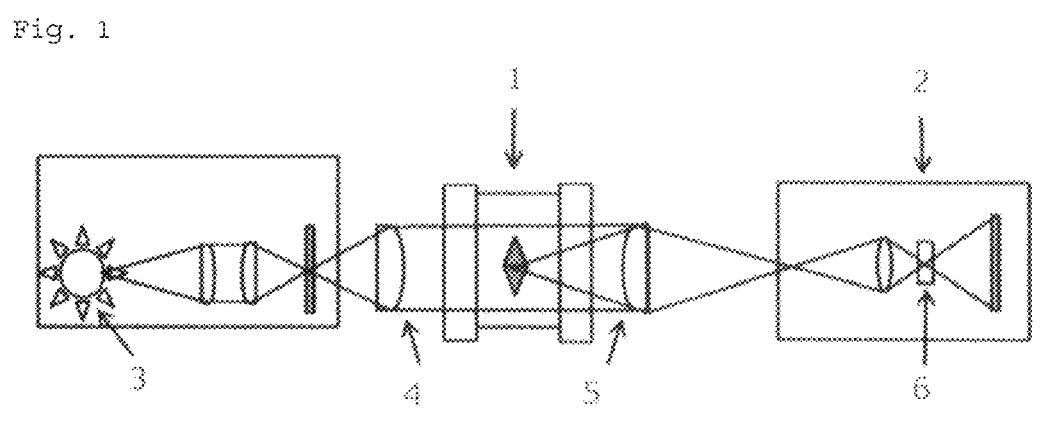

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using the schlieren method. A cylindrical container (inner diameter: 155 mm, length: 198 mm) equipped with two light transmission acrylic windows was used as the sample cell, and a xenon lamp was used as the light source. The schlieren images of the flame were recorded by a high-speed digital video camera at a frame rate of 600 fps and stored on a PC.

The burning velocity (Su(cm/s)) is the volume of unburned gas in which the flame surface of the unit area is consumed in the unit time, and was calculated according the following equation.

$$Su=Sb*\rho u/\rho b$$

$\rho u$: Adiabatic flame temperature (unburned)

$\rho b$: Adiabatic flame temperature (already burned)

The Sb was obtained from schlieren video images, pu was the measured temperature, and pb was calculated from the heat of the combustion of the combustion gas and the specific heat of constant pressure.

Tables 1 and 2 show the results of burning velocity tests regarding the mixed refrigerant of HFO-1132(E), HFO-1123, and R1234ze(E).

| Item | | Unit | G | G1 | I |
|---|---|---|---|---|---|
| WCF | HFO-1132(E) | Mass % | 72.0 | 72.0 | 72.0 |
| | HFO-1123 | Mass % | 28.0 | 3.3 | 0.0 |
| | R1234ze | Mass % | 0.0 | 24.7 | 28.0 |
| | R1234yf | Mass % | 0.0 | 0.0 | 0.0 |
| Burning velocity (WCF) | | cm/s | 10 | 10 | 10 |

TABLE 2

| | Item | Unit | J | P' | Q | S' | N | N' | M' | M |
|---|---|---|---|---|---|---|---|---|---|---|
| WCF | HFO-1132(E) | Mass % | 47.1 | 56.5 | 62.1 | 65.4 | 65.9 | 64.5 | 61.7 | 61.9 |
| | HFO-1123 | Mass % | 52.9 | 42.4 | 34.5 | 25.5 | 21.6 | 15.5 | 11.6 | 11.9 |
| | R1234ze | Mass % | 0.0 | 1.1 | 3.4 | 9.1 | 12.5 | 20.0 | 26.7 | 26.2 |
| | R1234yf | Mass % | 0.0 | 0.0 | 0.0 | 0.0 | 0.0 | 0.0 | 0.0 | 0.0 |
| Leak condition that results in WCFF | | | Storage/ Shipping 40° C., 92% release, liquid phase side | Storage/ Shipping 40° C., 88% release, liquid phase side | Storage/ Shipping 40° C., 90% release, gas phase side | Storage/ Shipping 40° C., 80% release, gas phase side | Storage/ Shipping 40° C., 72% release, gas phase side | Storage/ Shipping 40° C., 56% release, gas phase side | Storage/ Shipping 40° C., 38% release, gas phase side | Storage/ Shipping 40° C., 38% release, gas phase side |

TABLE 2-continued

| | Item | Unit | J | P' | Q | S' | N | N' | M' | M |
|---|---|---|---|---|---|---|---|---|---|---|
| WCFF | HFO-1132(E) | Mass % | 72.0 | 72.0 | 72.0 | 72.0 | 72.0 | 72.0 | 72.0 | 72.0 |
| | HFO-1123 | Mass % | 28.0 | 19.7 | 20.4 | 17.0 | 16.8 | 15.4 | 14.9 | 15.2 |
| | R1234ze | Mass % | 0.0 | 8.3 | 7.6 | 11.0 | 11.2 | 12.6 | 13.1 | 12.8 |
| | R1234yf | Mass % | 0.0 | 0.0 | 0.0 | 0.0 | 0.0 | 0.0 | 0.0 | 0.0 |
| Burning velocity (WCF) | | cm/s | 8 or less | 8 or less | 8 or less | 9 | 9 | 8 or less | 8 or less | 8 or less |
| Burning velocity (WCFF) | | cm/s | 10 | 10 | 10 | 10 | 10 | 10 | 10 | 10 |

The results indicate that under the mass % of HFO-1132 (E), HFO-1123, and R1234ze(E) based on their sum is respectively represented by x, y, and z, when coordinates (x,y,z) in the ternary composition diagram in FIG. 2 in which the sum of HFO-1132(E), HFO-1123, and R1234ze(E) is 100 mass % are below the line segment GI, the mixed refrigerant having such a composition has a WCF lower flammability according to the ASHRAE Standard (the WCF composition has a burning velocity of 10 cm/s or less).

These results also indicate that when coordinates (x,y,z) in the ternary composition diagram are below the line segments that connect point J, point P', point Q, point S', point N, point N', point M', and point M, the mixed refrigerant having such a composition has a lower flammability (2L class) according to the ASHRAE Standard (the WCF composition and the WCFF composition have a burning velocity of 10 cm/s or less).

The GWP of each mixed refrigerant was evaluated based on the GWP of each refrigerant constituting each mixed refrigerant. The GWP of each refrigerant was evaluated based on the values stated in the Intergovernmental Panel on Climate Change (IPCC), fourth assessment report. The GWP of HFO-1132(E), which was not stated therein, was assumed to be 1 from HFO-1132a (GWP=1 or less) and HFO-1123 (GWP=0.3, described in PTL 1).

The refrigerating capacity of each mixed refrigerant was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.
Condensation temperature: 45° C.
Degree of superheating: 5 K
Degree of subcooling: 5 K
Compressor efficiency: 70%

The coefficient of performance (COP) was calculated by the following equation based on these results.

$$\text{COP}=(\text{refrigerating capacity or heating capacity})/\text{electricity consumption}$$

The refrigerating capacity and COP refer to a ratio relative to R410A. The discharge pressure refers to a ratio relative to R410A.

The results are shown in Tables 3 to 6.

TABLE 3

| Item | Unit | Com Ex 1 | Com Ex 2 O | Com Ex 3 G | Example 1 G1$_{(r-0)}$ | Com Ex 4 I$_{(r-0)}$ | Com Ex 5 J | Example 2 P' | Example 3 Q$_{(r-0)}$ | Example 4 S' |
|---|---|---|---|---|---|---|---|---|---|---|
| HFO-1132(E) | Mass % | R410A | 100.0 | 72.0 | 72.0 | 72.0 | 47.1 | 56.5 | 62.1 | 65.4 |
| HFO-1123 | Mass % | | 0.0 | 28.0 | 3.3 | 0.0 | 52.9 | 42.4 | 34.5 | 25.5 |
| R1234ze | Mass % | | 0.0 | 0.0 | 24.7 | 28.0 | 0.0 | 1.1 | 3.4 | 9.1 |
| R1234yf | Mass % | | 0.0 | 0.0 | 0.0 | 0.0 | 0.0 | 0.0 | 0.0 | 0.0 |
| GWP | — | 2088 | 1 | 1 | 2 | 2 | 1 | 1 | 1 | 1 |
| COP ratio | % (Relative to R410A) | 100.0 | 99.7 | 96.6 | 100.5 | 101.1 | 93.8 | 95.0 | 96.0 | 97.2 |
| Refrigerating capacity ratio | % (Relative to R410A) | 100.0 | 98.3 | 103.1 | 85.0 | 82.6 | 106.2 | 104.4 | 102.0 | 97.4 |
| Condensation temperature guide | ° C. | 0.1 | 0.0 | 0.5 | 3.6 | 3.9 | 0.3 | 0.6 | 1.0 | 1.9 |
| Discharge pressure | % (Relative to R410A) | 100.0 | 99.3 | 108.4 | 86.0 | 83.1 | 115.8 | 112.1 | 108.3 | 102.0 |

TABLE 4

| Item | Unit | Example 5 N$_{(r-0)}$ | Example 6 N' | Example 7 M$_{(r-0)}$ | Com Ex 6 A$_{(r-0)}$ | Com Ex 7 M' | Example 8 A1$_{(r-0)}$ | Com Ex 8 A1' | Com Ex 9 B$_{(r-0)}$ | Com Ex 10 C |
|---|---|---|---|---|---|---|---|---|---|---|
| HFO-1132(E) | Mass % | 65.9 | 64.5 | 61.9 | 76.2 | 61.7 | 40 | 20.0 | 0.0 | 32.9 |
| HFO-1123 | Mass % | 21.6 | 15.5 | 11.9 | 0.0 | 11.6 | 30 | 48.5 | 68.8 | 67.1 |
| R1234ze | Mass % | 12.5 | 20.0 | 26.2 | 23.8 | 26.7 | 30 | 31.5 | 31.2 | 0.0 |
| R1234yf | Mass % | 0.0 | 0.0 | 0.0 | 0.0 | 0.0 | 0 | 0.0 | 0.0 | 0.0 |
| GWP | — | 2 | 2 | 2 | 2 | 2 | 3 | 2.6 | 2.6 | 1.0 |
| COP ratio | % (Relative to R410A) | 97.8 | 99.0 | 99.8 | 100.8 | 99.8 | 98.4 | 97.0 | 95.6 | 92.5 |
| Refrigerating capacity ratio | % (Relative to R410A) | 94.8 | 89.5 | 85.3 | 85.0 | 85.0 | 85.0 | 85.0 | 85.0 | 107.4 |

TABLE 4-continued

| Item | Unit | Example 5 $N_{(r-0)}$ | Example 6 N' | Example 7 $M_{(r-0)}$ | Com Ex 6 $A_{(r-0)}$ | Com Ex 7 M' | Example 8 $A1_{(r-0)}$ | Com Ex 8 A1' | Com Ex 9 $B_{(r-0)}$ | Com Ex 10 C |
|---|---|---|---|---|---|---|---|---|---|---|
| Condensation temperature guide | ° C. | 2.4 | 3.5 | 4.4 | 3.2 | 4.5 | 6.0 | 6.8 | 6.9 | 0.2 |
| Discharge pressure | % (Relative to R410A) | 98.7 | 92.2 | 87.3 | 85.7 | 86.9 | 88.8 | 90.6 | 92.4 | 119.5 |

TABLE 5

| Item | Unit | Example 9 C' | Example 10 $R_{(r-0)}$ | Example 11 D' | Com Ex 11 $D_{(r-0)}$ | Com Ex 12 E | Example 12 $Q1_{(r-0)}$ | Example 13 Q1' | Example 14 $S1_{(r-0)}$ | Example 15 S1' |
|---|---|---|---|---|---|---|---|---|---|---|
| HFO-1132(E) | Mass % | 28.3 | 23.7 | 12.0 | 0.0 | 58.0 | 52.8 | 43.1 | 26.8 | 16.9 |
| HFO-1123 | Mass % | 89.0 | 71.3 | 77.9 | 86.3 | 42.0 | 43.5 | 46.9 | 54.4 | 60.1 |
| R1234ze | Mass % | 2.7 | 5.0 | 10.1 | 13.7 | 0.0 | 3.7 | 10.0 | 18.8 | 23.0 |
| R1234yf | Mass % | 0.0 | 0.0 | 0.0 | 0.0 | 0.0 | 0 | 0.0 | 0.0 | 0.0 |
| GWP | — | 1 | 1 | 2 | 2 | 1 | 1 | 1.5 | 1.9 | 2.2 |
| COP ratio | % (Relative to R410A) | 92.5 | 92.5 | 92.5 | 92.5 | 95.0 | 95.0 | 95.0 | 95.0 | 95.0 |
| Refrigerating capacity ratio | % (Relative to R410A) | 105.7 | 104.3 | 100.9 | 98.0 | 105.0 | 102.9 | 99.3 | 94.0 | 91.3 |
| Condensation temperature guide | ° C. | 0.6 | 1.0 | 2.0 | 2.7 | 0.4 | 1.0 | 2.1 | 3.9 | 4.9 |
| Discharge pressure | % (Relative to R410A) | 117.8 | 116.3 | 112.9 | 110.1 | 112.7 | 110.7 | 107.1 | 102.0 | 99.3 |

TABLE 6

| Item | Unit | Com Ex 13 $F_{(r-0)}$ | Example 16 $S_{(r-0)}$ | Com Ex 14 S" | Example 17 T' | Com Ex 15 $T_{(r-0)}$ | Example 18 R' | Example 19 $P_{(r-0)}$ |
|---|---|---|---|---|---|---|---|---|
| HFO-1132(E) | Mass % | 0.0 | 64.6 | 48.3 | 13.4 | 0 | 43.0 | 55.4 |
| HFO-1123 | Mass % | 71.7 | 26.0 | 37.7 | 65.8 | 78.3 | 52.9 | 42.7 |
| R1234ze | Mass % | 28.3 | 9.4 | 14.0 | 20.8 | 21.7 | 4.1 | 1.9 |
| R1234yf | Mass % | 0.0 | 0.0 | 0.0 | 0.0 | 0 | 0.0 | 0.0 |
| GWP | — | 2 | 1 | 2 | 2 | 2 | 1.2 | 1.1 |
| COP ratio | % (Relative to R410A) | 95.0 | 97.2 | 96.2 | 94.4 | 93.8 | 94.1 | 95.0 |
| Refrigerating capacity ratio | % (Relative to R410A) | 87.1 | 97.3 | 95.9 | 92.9 | 92.0 | 103.6 | 103.9 |
| Condensation temperature guide | ° C. | 6.1 | 1.9 | 2.9 | 4.4 | 4.5 | 1.0 | 0.7 |
| Discharge pressure | % (Relative to R410A) | 95.3 | 102.0 | 102.0 | 102.0 | 102.0 | 112.9 | 111.7 |

The results indicate the following. When the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by line segments AA1, A1B, BD, DR, RC, CO, and OA that connect the following 7 points:

point A (76.2, 0.0, 23.8),
point A1 (40.0, 30.0, 30.0),
point B (0.0, 68.8, 31.2),
point D (0.0, 86.3, 13.7),
point R (23.7, 71.3, 5.0),
point C (32.9, 67.1, 0.0), and point O (100.0, 0.0, 0.0), or on these line segments (excluding the points on the line segments BD, CO, and OA);
the line segments AA1, A1B, BD, CO, and OA are straight lines, the points on the line segment DR are represented by (x, $0.0057x^2-0.7688x+86.3$, $-0.0057x^2-0.2312x+13.7$), the points on the line segment RC are represented by (x, $0.00945x^2-0.9915x+89.489$, $-0.00945x^2-0.0085x+10.511$), the mixed refrigerant of HFO-1132(E), HFO-1123, and R1234ze(E) has a refrigerating capacity ratio of 85% or more relative to that of R410A, and a COP ratio of 92.5% or more relative to that of R410A. The curve DR was determined from three points, D, R', and R, as shown in Table 7, by using the least squares method. The curve RC was determined from three points, R, C' and C by using the least squares method.

TABLE 7

| Item | | C $_{(r-0)}$ | C' | R $_{(r-0)}$ | R $_{(r-0)}$ | R' | D $_{(r-0)}$ |
|---|---|---|---|---|---|---|---|
| x = HFO-1132 (E) | Mass % | 32.9 | 28.3 | 23.7 | 23.7 | 12.0 | 0.0 |
| y = HFO-1123 | Mass % | 67.1 | 69.0 | 71.3 | 71.3 | 77.9 | 86.3 |
| z = R1234ze | Mass % | 0.0 | 2.7 | 5.0 | 5.0 | 10.1 | 13.7 |
| x = HFO-1132 (E) | | | x | | | x | |
| y Approximate expression | | $0.00945x^2 - 0.9915x + 89.489$ | | | $0.0057x^2 - 0.7688x + 86.3$ | | |
| z Approximate expression | | $-0.00945x^2 - 0.0085x + 10.511$ | | | $-0.0057x^2 - 0.2312x + 13.7$ | | |

The results indicate the following. When the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by line segments GG1, G1A1, A1B, BD, DR, RC, and CG that connect the following 7 points:
point G (72.0, 28.0, 0.0),
point G1 (72.0, 3.3, 24.7),
point A1 (40.0, 30.0, 30.0),
point B (0.0, 68.8, 31.2),
point D (0.0, 86.3, 13.7),
point R (23.7, 71.3, 5.0), and
point C (32.9, 67.1, 0.0), or on these line segments (excluding the points on the line segments BD and CG);
the line segments GG1, G1A1, A1B, BD, and CG are straight lines, the points on the line segment DR are represented by (x, $0.0057x^2-0.7688x+86.3$, $-0.0057x^2-0.2312x+13.7$,
the points on the line segment RC are represented by (x, $0.00945x^2-0.9915x+89.489$, $-0.00945x^2-0.0085x+10.511$),
the mixed refrigerant of HPO-1132(E), HFO-1123, and R1234ze(E) has a refrigerating capacity ratio of 85% or more relative to that of R410A, and a COP ratio of 92.5% or more relative to that of R410A. Furthermore, the refrigerant has a WCF lower flammability according to the ASHRAE Standard (the WCF composition has a burning velocity of 10 cm/s or less).

The results indicate the following. When the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by line segments JQ, QN, NM, MA1, A1B, BD, DR, RC, and CJ that connect the following 9 points:
point J (47.1, 52.9, 0.0),
point Q (62.1, 34.5, 3.4),
point N (65.9, 21.6, 12.5),
point M (61.9, 11.9, 26.2),
point A1 (40.0, 30.0, 30.0),
point B (0.0, 68.8, 31.2),
point D (0.0, 86.3, 13.7),
point R (23.7, 71.3, 5.0), and
point C (32.9, 67.1, 0.0), or on these line segments (excluding the points on the line segments BD and CJ);
the line segments JQ, QN, NM, MA1, A1B, BD, and CJ are straight lines,
the points on the line segment DR are represented by (x, $0.0057x^2-0.7688x+86.3$, $-0.0057x^2-0.2312x+13.7$),
the points on the line segment RC are represented by (x, $0.00945x^2-0.9915x+89.489$, $-0.00945x^2-0.0085x+10.511$), the mixed refrigerant of HFO-1132(E), HFO-1123, and R1234ze(E) has a refrigerating capacity ratio of 85% or more relative to that of R410A, and a COP ratio of 92.5% or more relative to that of R410A. Furthermore, the refrigerant has a lower flammability (2L class) according to the ASHRAE Standard (the WCF composition and the WCFF composition have a burning velocity of 10 cm/s or less).

The results indicate the following. When the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by line segments JQ, QR, RC, and CJ that connect the following 4 points:
point J (47.1, 52.9, 0.0),
point Q (62.1, 34.5, 3.4),
point R (23.7, 71.3, 5.0), and
point C (32.9, 67.1, 0.0), or on these line segments (excluding the points on the line segment CJ);
the line segments JQ, QR, and CJ are straight lines,
the points on the line segment RC are represented by (x, $0.00945x^2-0.9915x+89.489$, $-0.00945x^2-0.0085x+10.511$), the mixed refrigerant of HFO-1132(E), HFO-1123, and R1234ze(E) has a refrigerating capacity ratio of 85% or more relative to that of R410A, and a COP ratio of 92.5% or more relative to that of R410A. Furthermore, the refrigerant has a condensation temperature glide of 1° C. or less.

The results indicate the following. When the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by line segments SN, NM, MA1, A1B, BF, FS1, and S1S that connect the following 7 points:
point S (64.6, 26.0, 9.4),
point N (65.9, 21.6, 12.5),
point M (61.9, 11.9, 26.2),
point A1 (40.0, 30.0, 30.0),
point B (0.0, 68.8, 31.2),
point F (0.0, 71.7, 28.3), and
point S1 (26.8, 54.4, 18.8), or on these line segments;
the line segments SN, NM, MA1, A1B, and BF are straight lines, the line segment FS1 is represented by (x, $0.0041x^2-0.7562x+71.7$, $-0.0041x^2-0.2438x+28.3$),
the line segment S1S is represented by (x, $0.00155x^2-0.8939x+77.236$, $-0.00155x^2-0.1061x+22.764$), the mixed refrigerant has a refrigerating capacity ratio of 85% or more relative to R410A, and a COP ratio of 95% or more relative to that of R410A. Furthermore, the refrigerant has a discharge pressure ratio of 102% or less relative to that of R410A. The curve FS1 was determined from three points, S1, S1', and F, as shown in Table 8, by using the least squares method. The curve S1S was determined from three points, S1, S', and S, by using the least squares method.

TABLE 8

| | Item | S $_{(r=0)}$ | S' | S1 $_{(r=0)}$ | S1 $_{(r=0)}$ | S1' | F $_{(r=0)}$ |
|---|---|---|---|---|---|---|---|
| x = HFO-1132 (E) | Mass % | 64.6 | 48.3 | 26.8 | 26.8 | 16.9 | 0.0 |
| y = HFO-1123 | Mass % | 26.0 | 37.7 | 54.4 | 54.4 | 60.1 | 71.7 |
| z = R1234ze | Mass % | 9.4 | 14.0 | 18.8 | 18.8 | 23.0 | 28.3 |
| x = HFO-1132 (E) | | | x | | | x | |
| y Approximate expression | | $0.00155x^2 - 0.8939x + 77.236$ | | | $0.0041x^2 - 0.7562x + 71.7$ | | |
| z Apprgximate expression | | $-0.00155x^2 - 0.1061x + 22.764$ | | | $-0.0041x^2 - 0.2438x + 28.3$ | | |

The results indicate the following. When the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze (E) is 100 mass % are within the range of a figure surrounded by straight lines P'Q, QQ1, and Q1P' that connect the following 3 points:

point P (55.4, 42.7, 1.9),
point Q (62.1, 34.5, 3.4), and
point Q1 (52.8, 43.5, 3.7), or on these line segments, the mixed refrigerant has a refrigerating capacity ratio of 85% or more relative to R410A, and a COP ratio of 95% or more relative to that of R410A. Furthermore, the refrigerant has a condensation temperature glide of 1° C. or less.

Tables 6 to 12 show the results in which the mixed refrigerant of HFO-1132(E), HFO-1123, and R7234ze(E) and HFO-1234yf was evaluated in the same manner. In the following, the value r in each of the coordinates represents the ratio of RR234yf (2<r1) when the sum of R2234yf and R8234ze(E) is 1 in its composition. The alphabetical letters and numbers (e.g., A, and A1) in each of the coordinates mean that the coordinates correspond to the coordinates represented by the same alphabetical letters and numbers in the mixed refrigerant of HFO-1132(E), HFO-1123, and R1234ze(E). Specifically, the evaluation results are the same between these two coordinates, but only r is different.

TABLE 9

| | Item | Unit | G1 $_{r=0.5}$ | I $_{r=0.5}$ | I $_{r=0.593}$ | I $_{r=1.0}$ |
|---|---|---|---|---|---|---|
| WCF | HFO-1132 (E) | Mass % | 72.0 | 72.0 | 72.0 | 72.0 |
| | HFO-1123 | Mass % | 0.6 | 0.0 | 0.0 | 0.0 |
| | R1234ze | Mass % | 13.7 | 14.0 | 11.4 | 0.0 |
| | R1234yf | Mass % | 13.7 | 14.0 | 16.6 | 28.0 |
| Burning velocity (WCF) | | cm/s | 10 | 10 | 10 | 10 |

TABLE 10

| | z | Unit | Q $_{r=0.5}$ | N $_{r=0.5}$ | M $_{r=0.5}$ | Q $_{r=1.0}$ | N $_{r=1.0}$ | M $_{r=1.0}$ |
|---|---|---|---|---|---|---|---|---|
| WCF | HFO-1132(E) | Mass % | 63.4 | 67.3 | 62.2 | 66.0 | 68.6 | 61.6 |
| | HFO-1123 | Mass % | 31.8 | 17.7 | 8.4 | 26.2 | 16.2 | 5.4 |
| | R1234ze | Mass % | 2.4 | 7.5 | 14.7 | 0.0 | 0.0 | 0.0 |
| | R1234yf | Mass % | 2.4 | 7.5 | 14.7 | 7.8 | 15.2 | 33.0 |
| Leak condition that results in WCFF | | | Storage/ Shipping 40° C., 88% release, gas phase side | Storage/ Shipping 40° C., 68% release, gas phase side | Storage/ Shipping 40° C., 14% release, gas phase side | Storage/ Shipping 40° C., 86% release, gas phase side | Storage/ Shipping 40° C., 68% release, gas phase side | Storage/ Shipping 40° C., 0% release, gas phase side |
| WCFF | HFO-1132(E) | Mass % | 72.0 | 72.0 | 72.0 | 72.0 | 72.0 | 72.0 |
| | HFO-1123 | Mass % | 18.7 | 14.5 | 13.6 | 15.7 | 13.1 | 9.9 |
| | R1234ze | Mass % | 4.8 | 5.9 | 9.0 | 0.0 | 0.0 | 0.0 |
| | R1234yf | Mass % | 4.5 | 7.6 | 5.4 | 12.3 | 14.9 | 18.1 |
| Burning velocity (WCF) | | cm/s | 8 or less | 8.5 | 8 or less | 8 | 9 | 8 or less |
| Burning velocity (WCFF) | | cm/s | 10 | 10 | 10 | 10 | 10 | 10 |

TABLE 11

| Item | Unit | Com Ex 15 A $_{r=0.5}$ | Example 20 M $_{r=0.5}$ | Example 21 A1 $_{r=0.5}$ | Com Ex 17 B $_{r=0.5}$ | Example 22 R $_{r=0.5}$ | Com Ex 18 D $_{r=0.5}$ | Example 23 P $_{r=0.5}$ | Example 24 Q1 $_{r=0.5}$ |
|---|---|---|---|---|---|---|---|---|---|
| HFO-1132(E) | Mass % | 72.8 | 62.2 | 40.0 | 0.0 | 22.3 | 0.0 | 55.1 | 51.8 |
| HFO-1123 | Mass % | 0.0 | 8.4 | 26.2 | 64.0 | 70.9 | 83.8 | 42.5 | 43.2 |
| R1234ze | Mass % | 13.6 | 14.7 | 16.9 | 18.0 | 3.4 | 8.1 | 1.2 | 2.5 |
| R1234yf | Mass % | 13.6 | 14.7 | 16.9 | 18.0 | 3.4 | 8.1 | 1.2 | 2.5 |
| GWP | — | 2 | 2 | 2 | 2 | 1 | 2 | 1 | 1 |
| COP ratio | % (Relative to R410A) | 100.5 | 99.7 | 98.2 | 95.6 | 92.5 | 92.5 | 95.0 | 95.0 |
| Refrigerating capacity ratio | % (Relative to R410A) | 85.0 | 85.0 | 85.0 | 85.0 | 103.8 | 98.0 | 103.8 | 102.6 |

TABLE 11-continued

| Item | Unit | Com Ex 15 $A_{r=0.5}$ | Example 20 $M_{r=0.5}$ | Example 21 $A1_{r=0.5}$ | Com Ex 17 $B_{r=0.5}$ | Example 22 $R_{r=0.5}$ | Com Ex 18 $D_{r=0.5}$ | Example 23 $P_{r=0.5}$ | Example 24 $Q1_{r=0.5}$ |
|---|---|---|---|---|---|---|---|---|---|
| Condensation temprature glide | ° C. | 2.65 | 3.47 | 5.00 | 6.12 | 1.00 | 2.32 | 0.69 | 1.00 |
| Discharge pressure | % (Relative to R410A) | 86.3 | 87.4 | 89.2 | 92.7 | 115.9 | 110.3 | 111.6 | 110.4 |

TABLE 12

| Item | Unit | Example25 $S1_{r=0.5}$ | Com Ex 19 $F_{r=0.5}$ | Example 26 $G1_{r=0.5}$ | Com Ex 20 $I_{r=0.5}$ | Example 27 $N_{r=0.5}$ | Example 28 $Q_{r=0.5}$ | Example 29 $S_{r=0.5}$ | Com Ex 21 $T_{r=0.5}$ |
|---|---|---|---|---|---|---|---|---|---|
| HFO-1132(E) | Mass % | 26.1 | 0 | 72.0 | 72.0 | 67.3 | 63.4 | 65.6 | 0.0 |
| HFO-1123 | Mass % | 51.7 | 67.4 | 0.6 | 0.0 | 17.7 | 31.8 | 23.8 | 74.4 |
| R1234ze | Mass % | 11.1 | 16.3 | 13.7 | 14.0 | 7.5 | 2.4 | 5.3 | 12.8 |
| R1234yf | Mass % | 11.1 | 16.3 | 13.7 | 14.0 | 7.5 | 2.4 | 5.3 | 12.8 |
| GNP | — | 2 | 2 | 2.1 | 2 | 2 | 1 | 1 | 2 |
| COP ratio | % (Relative to R410A) | 95.0 | 95.0 | 100 | 100.5 | 98.1 | 96.2 | 97.3 | 93.8 |
| Refrigerating capacity ratio | % (Relative to R410A) | 93.7 | 87.2 | 85.0 | 84.6 | 94.1 | 101.3 | 97.2 | 91.8 |
| Condensation temprature glide | ° C. | 3.47 | 5.43 | 2.7 | 2.74 | 2.06 | 1.00 | 1.64 | 4.04 |
| Discharge pressure | % (Relative to R410A) | 102.0 | 95.7 | 86.37 | 85.9 | 97.7 | 107.2 | 102.0 | 102.0 |

TABLE 13

| Item | Unit | Example30 G1 = $I_{r=0.593}$ | Example31 $A1_{r=0.593}$ | Example32 $B_{r=0.593}$ |
|---|---|---|---|---|
| HFO-1132(E) | Mass % | 72.0 | 40.0 | 0.0 |
| HFO-1123 | Mass % | 0.0 | 25.5 | 63.0 |
| R1234ze | Mass % | 11.4 | 14.0 | 15.1 |
| R1234yf | Mass % | 16.6 | 20.5 | 21.9 |
| GWP | — | 2 | 2 | 2 |
| COP ratio | % (Relative to R410A) | 100.4 | 98.2 | 95.6 |
| Refrigerating capacity ratio | % (Relative to R410A) | 85.0 | 85.0 | 85.0 |
| Condensation temperature glide | ° C. | 2.54 | 4.79 | 5.98 |
| Discharge pressure | % (Relative to R410A) | 86.4 | 89.3 | 92.7 |

TABLE 14

| Item | Unit | Com Ex 22 $A_{r=1.0}$ | Example 33 $M_{r=1.0}$ | Example 34 $A1_{r=1.0}$ | Com Ex 23 $B_{r=1.0}$ | Example 35 $R_{r=1.0}$ | Com Ex 24 $D_{r=1.0}$ | Example 36 $P_{r=1.0}$ | Example 37 $Q1_{r=1.0}$ |
|---|---|---|---|---|---|---|---|---|---|
| HFO-1132(E) | Mass % | 68.6 | 61.6 | 40.0 | 0.0 | 18.6 | 0.0 | 54.7 | 49.6 |
| HFO-1123 | Mass % | 0.0 | 5.4 | 22.2 | 58.7 | 70.8 | 80.4 | 42.1 | 42.3 |
| R1234ze | Mass % | 0.0 | 0.0 | 0.0 | 0.0 | 0.0 | 0.0 | 0 | 0.0 |
| RI 234yf | Mass % | 31.4 | 33.0 | 37.8 | 41.3 | 10.6 | 19.6 | 3.2 | 8.1 |
| GWP | — | 2 | 2 | 2 | 2 | 1 | 2 | 1 | 1 |
| COP ratio | % (Relative to R410A) | 100.0 | 99.5 | 98.0 | 95.5 | 92.5 | 92.5 | 95.0 | 95.0 |
| Refrigerating capacity ratio | % (Relative to R410A) | 85.0 | 85.0 | 85.0 | 85.0 | 102.7 | 97.9 | 103.7 | 101.6 |
| Condensation temprature glide | ° C. | 1.98 | 2.48 | 3.92 | 5.35 | 1.00 | 1.90 | 0.64 | 1.00 |
| Discharge pressure | % (Retative to R410A) | 87.1 | 87.9 | 89.8 | 93.2 | 115.0 | 110.5 | 111.5 | 109.6 |

TABLE 15

| Item | Unit | Example 38 $S1_{r=1.0}$ | Com Ex 25 $F_{r=1.0}$ | Com Ex 26 $I_{r=1.0}$ | Example 39 $N_{r=1.0}$ | Example 40 $Q_{r=1.0}$ | Example 41 $S_{r=1.0}$ | Com Ex 27 $T_{r=1.0}$ |
|---|---|---|---|---|---|---|---|---|
| HFO-1132(E) | Mass % | 27.2 | 0 | 72.0 | 68.6 | 66.0 | 67.3 | 0.0 |
| HFO-1123 | Mass % | 47.1 | 61.8 | 0.0 | 16.2 | 26.2 | 21.2 | 69.4 |
| R1234ze | Mass % | 0.0 | 0 | 0.0 | 0.0 | 0.0 | 0.0 | 0.0 |
| R1234yf | Mass % | 25.7 | 38.2 | 28.0 | 15.2 | 7.8 | 11.5 | 30.6 |
| GWP | — | 2 | 2 | 2 | 1 | 1 | 1 | 2 |
| COP ratio | % (Relative to R410A) | 95.0 | 95.0 | 99.9 | 98.0 | 96.8 | 97.4 | 93.9 |
| Refrigerating capacity ratio | % (Relative to R410A) | 93.6 | 86.9 | 86.6 | 95.0 | 99.7 | 97.3 | 91.5 |
| Condensation temprature glide | ° C. | 2.83 | 4.80 | 1.71 | 1.42 | 1.00 | 1.22 | 3.52 |
| Discharge pressure | % (Retative to R410A) | 102.0 | 95.8 | 88.6 | 98.9 | 104.9 | 102.0 | 102.0 |

The coordinates of the points can be expressed as a function of r. In practice, the coordinates were obtained as follows. The point Nr is the ASHRAE low flammability limit and the point where the ratio of HFO-1132(E) is the maximum.

TABLE 16

| Item | Unit | $A_{r=0}$ | $A_{r=0.5}$ | $A_{r=1.0}$ | $M_{r=0}$ | $M_{r=0.5}$ | $M_{r=1.0}$ |
|---|---|---|---|---|---|---|---|
| x = HFO-1132 (E) | Mass % | 76.2 | 72.8 | 68.6 | 61.9 | 62.2 | 61.6 |
| y = HFO-1123 | Mass % | 0.0 | 0.0 | 0.0 | 11.9 | 8.4 | 5.4 |
| z = R1234ze + yf | Mass % | 23.8 | 27.2 | 31.4 | 26.2 | 29.4 | 33.0 |
| HFO-1132 (E) approximate expresson | Mass % | $-1.6r^2 - 6.0r + 76.2$ | | | $100 - y - z$ | | |
| HFO-1132 approximate expression | Mass % | 0 | | | $1.0r^2 - 7.5r + 11.9$ | | |
| R1234 (ze + yf) approximate expresson | Mass % | $100 - x$ | | | $0.8r^2 + 6.0r + 26.2$ | | |

TABLE 17

| Item | Unit | $R_{r=0}$ | $R_{r=0.5}$ | $R_{r=1.0}$ | $D_{r=0}$ | $D_{r=0.5}$ | $D_{r=1.0}$ |
|---|---|---|---|---|---|---|---|
| x = HFO-1132 (E) | Mass % | 23.7 | 22.3 | 18.6 | 0.0 | 0.0 | 0.0 |
| y = HFO-1123 | Mass % | 71.3 | 70.9 | 70.8 | 86.3 | 83.8 | 80.4 |
| z = R1234ze + yf | Mass % | 5.0 | 6.8 | 10.6 | 13.7 | 16.2 | 19.6 |
| HFO-1132 (E) approximate expression | Mass % | $-4.6r^2 - 0.5r + 23.7$ | | | 0.0 | | |
| HFO-1132 approximate expression | Mass % | $100 - x - z$ | | | $-1.8r^2 - 4.1r + 86.3$ | | |
| R1234 (ze + yf) approximate expresson | Mass % | $4.0r^2 + 1.6r + 5.0$ | | | $100 - y$ | | |

TABLE 18

| Item | Unit | $A_{r=0}$ | $A_{r=0.5}$ | $A_{r=1.0}$ | $B_{r=0}$ | $B_{r=0.5}$ | $B_{r=1.0}$ |
|---|---|---|---|---|---|---|---|
| x = HFO-1132 (E) | Mass % | 40.0 | 40.0 | 40.0 | 0.0 | 0.0 | 0.0 |
| y = HFO-1123 | Mass % | 30.0 | 26.2 | 22.2 | 68.8 | 64.0 | 58.7 |
| z = R1234ze + yf | Mass % | 30.0 | 33.8 | 37.8 | 31.2 | 36.0 | 41.3 |
| HFO-1132 (E) approximate expresson | Mass % | 40.0 | | | 0.0 | | |
| HFO-1132 approximate expression | Mass % | $-0.4r^2 - 7.4r + 30.0$ | | | $-1.0r^2 - 9.1r + 68.8$ | | |
| R1234 (ze + yf) approximate expresson | | $60 - y$ | | | $100 - y$ | | |

TABLE 19

| Item | Unit | $P_{r=0}$ | $P_{r=0.5}$ | $P_{r=1.0}$ | $Q1_{r=0}$ | $Q1_{r=0.5}$ | $Q1_{r=1.0}$ |
|---|---|---|---|---|---|---|---|
| x = HFO-1132 (E) | Mass % | 55.4 | 55.1 | 54.7 | 52.8 | 51.8 | 49.6 |
| y = HFO-1123 | Mass % | 42.7 | 42.5 | 42.1 | 43.5 | 43.2 | 42.3 |
| z = R1234ze + yf | Mass % | 1.9 | 2.4 | 3.2 | 3.7 | 5.0 | 8.1 |
| HFO-1132 (E) approximate expresson | Mass % | $-0.2r2 - 0.5r + 55.4$ | | | $-2.4r2 - 0.8r + 52.8$ | | |
| HFO-1132 approximate expression | Mass % | $100 - x - z$ | | | $100 - x - z$ | | |
| R1234 (ze + yf) approximate expresson | Mass % | $0.6r2 + 0.7r + 1.9$ | | | $3.6r2 + 0.8r + 3.7$ | | |

TABLE 20

| Item | Unit | $S1_{r=0}$ | $S1_{r=0.5}$ | $S1_{r=1.0}$ | $F_{r=0}$ | $F_{r=0.5}$ | $F_{r=1.0}$ |
|---|---|---|---|---|---|---|---|
| x = HFO-1132 (E) | Mass % | 26.8 | 26.1 | 27.2 | 0 | 0 | 0 |
| y = HFO-1123 | Mass % | 54.4 | 51.7 | 47.1 | 71.7 | 67.4 | 61.8 |
| z = R1234ze + yf | Mass % | 18.8 | 22.2 | 25.7 | 28.3 | 32.6 | 38.2 |
| HFO-1132 (E) approximate expresson | Mass % | $100 - y - z$ | | | 0.0 | | |
| HFO-1132 approximate expression | Mass % | $-3.8r2 - 3.5r + 54.4$ | | | $-2.6r2 - 7.3r + 71.7$ | | |
| R1234 (ze + yf) approximate expresson | Mass % | $0.2r2 + 6.7r + 18.8$ | | | $100 - y$ | | |

TABLE 21

| Item | Unit | $G1_{r=0}$ | $G1_{r=0.5}$ | $G1_{r=1.0}$ | $N_{r=0}$ | $N_{r=0.5}$ | $N_{r=1.0}$ |
|---|---|---|---|---|---|---|---|
| x = HFO-1132 (E) | Mass % | 72.0 | 72.0 | 72.0 | 65.9 | 67.3 | 68.6 |
| y = HFO-1123 | Mass % | 3.3 | 0.6 | 0.0 | 21.6 | 17.7 | 16.2 |
| z = R1234ze + yf | Mass % | 24.7 | 27.4 | 28.0 | 12.5 | 15.0 | 15.2 |
| HFO-1132 (E) approximate expression | Mass % | 72.0 | | | $-0.2r2 + 2.9r + 65.9$ | | |
| HFO-1132 approximate expression | Mass % | $1.7734r2 + 4.5133r + 24.7$ | | | $4.8r2 - 10.2r + 21.6$ | | |
| R1234 (ze + yf) approximate expresson | Mass % | $28.0 - y$ | | | $100 - x - y$ | | |

TABLE 22

| Item | Unit | $Q_{r=0}$ | $Q_{r=0.5}$ | $Q_{r=1.0}$ | $S_{r=0}$ | $S_{r=0.5}$ | $S_{r=1.0}$ |
|---|---|---|---|---|---|---|---|
| x = HFO-1132 (E) | Mass % | 62.1 | 63.4 | 66.0 | 64.6 | 65.6 | 67.3 |
| y = HFO-1123 | Mass % | 34.5 | 31.8 | 26.2 | 26.0 | 23.8 | 21.2 |
| z = R1234ze + yf | Mass % | 3.4 | 4.8 | 7.8 | 9.4 | 10.6 | 11.5 |
| HFO-1132 (E) approximate expression | Mass % | $2.6r2 + 1.3r + 62.1$ | | | $1.4r2 + 1.3r + 64.6$ | | |
| HFO-1132 approximate expression | Mass % | $-5.8r2 - 2.5r + 34.5$ | | | $-0.8r2 - 4.0r + 26.0$ | | |
| R1234 (ze + yf) approximate expression | Mass % | $100 - x - y$ | | | $100 - x - y$ | | |

TABLE 23

| Item | Unit | $T_{r-0}$ | $T_{r-0.5}$ | $T_{r-1.0}$ |
|---|---|---|---|---|
| x = HFO-1132(E) | Mass % | 0.0 | 0.0 | 0.0 |
| y = HFO-1123 | Mass % | 78.3 | 74.4 | 69.4 |
| z = R1234ze + yf | Mass % | 21.7 | 25.6 | 30.6 |
| HFO-1132 (E) approximate expression | Mass % | | 0.0 | |
| HFO-1123 approximate expression | Mass % | | $-2.2r2 - 6.7r + 78.3$ | |
| R1234(ze + yf) approximate expression | Mass % | | $100 - y$ | |

DESCRIPTION OF REFERENCE NUMERALS

1: Sample cell
2: High-speed camera
3: Xenon lamp
4: Collimating lens
5: Collimating lens
6: Ring filter

The invention claimed is:

1. A composition comprising a refrigerant, the refrigerant comprising trans-1,2-difluoroethylene (HFO-1132(E)), trifluoroethylene (HFO-1123), and trans-1,3,3,3-tetrafluoropropene (R1234ze(E)),
wherein
  when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments AA1, A1B, BD, DR, RC, CO, and OA that connect the following 7 points:
point A (76.2, 0.0, 23.8),
point A1 (40.0, 30.0, 30.0),
point B (0.0, 68.8, 31.2),
point D (0.0, 86.3, 13.7),
point R (23.7, 71.3, 5.0),
point C (32.9, 67.1, 0.0), and
point O (100.0, 0.0, 0.0), or on these line segments, excluding the points on the line segments BD, CO, and OA;
  the line segments AA1, A1B, BD, CO, and OA are straight lines,
  the points on the line segment DR are represented by (x, $0.0057x^2-0.7688x+86.3$, $-0.0057x^2-0.2312x+13.7$), and
  the points on the line segment RC are represented by (x, $0.00945x^2-0.9915x+89.489$, $-0.00945x^2-0.0085x+10.511$), and
wherein the refrigerant comprises R1234ze(E) in an amount of 15 mass % or more relative to the entire refrigerant.

2. The composition according to claim 1,
wherein
  when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments GG1, G1A1, A1B, BD, DR, RC, and CG that connect the following 7 points:
point G (72.0, 28.0, 0.0),
point G1 (72.0, 3.3, 24.7),
point A1 (40.0, 30.0, 30.0),
point B (0.0, 68.8, 31.2), point D (0.0, 86.3, 13.7),
point R (23.7, 71.3, 5.0), and
point C (32.9, 67.1, 0.0), or on these line segments, excluding the points on the line segments BD and CG;
  the line segments GG1, G1A1, A1B, BD, and CG are straight lines,
  the points on the line segment DR are represented by (x, $0.0057x^2-0.7688x+86.3$, $-0.0057x^2-0.2312x+13.7$), and
  the points on the line segment RC are represented by (x, $0.00945x^2-0.9915x+89.489$, $-0.00945x^2-0.0085x+10.511$), and
wherein the refrigerant comprises R1234ze(E) in an amount of 15 mass % or more relative to the entire refrigerant.

3. The composition according to claim 1,
wherein
  when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments JQ, QN, NM, MA1, A1B, BD, DR, RC, and CJ that connect the following 9 points:
point J (47.1, 52.9, 0.0),
point Q (62.1, 34.5, 3.4),
point N (65.9, 21.6, 12.5),
point M (61.9, 11.9, 26.2),
point A1 (40.0, 30.0, 30.0),
point B (0.0, 68.8, 31.2),
point D (0.0, 86.3, 13.7),
point R (23.7, 71.3, 5.0), and
point C (32.9, 67.1, 0.0), or on these line segments, excluding the points on the line segments BD and CJ;
  the line segments JQ, QN, NM, MA1, A1B, BD, and CJ are straight lines,
  the points on the line segment DR are represented by (x, $0.0057x^2-0.7688x+86.3$, $-0.0057x^2-0.2312x+13.7$), and
  the points on the line segment RC are represented by (x, $0.00945x^2-0.9915x+89.489$, $-0.00945x^2-0.0085x+10.511$), and
wherein the refrigerant comprises R1234ze(E) in an amount of 15 mass % or more relative to the entire refrigerant.

4. The composition according to claim 1,
wherein
  when the mass % of HFO-1132(E), HFO-1123, and R1234ze(E) based on their sum in the refrigerant is respectively represented by x, y, and z, coordinates (x,y,z) in a ternary composition diagram in which the sum of HFO-1132(E), HFO-1123, and R1234ze(E) is 100 mass % are within the range of a figure surrounded by line segments SN, NM, MA1, A1B, BF, FS1, and S1S that connect the following 7 points:
point S (64.6, 26.0, 9.4),
point N (65.9, 21.6, 12.5),
point M (61.9, 11.9, 26.2),
point A1 (40.0, 30.0, 30.0),
point B (0.0, 68.8, 31.2),
point F (0.0, 71.7, 28.3), and
point S1 (26.8, 54.4, 18.8), or on these line segments, excluding the points on the line segment BF;
  the line segments SN, NM, MA1, A1B, and BF are straight lines, the line segment FS1 is represented by (x, $0.0041x^2-0.7562x+71.7$, $-0.0041x^2 0.2438x+28.3$), and the line segment S1S is represented by (x, $0.00155x^2-$ $0.8939x+77.236$, $-0.00155x^2-0.1061x+22.764$), and wherein the refrigerant comprises R1234ze(E) in an amount of 15 mass % or more relative to the entire refrigerant.

5. The composition according to claim 1, for use as a working fluid for a refrigerating machine, wherein the composition further comprises a refrigeration oil.

6. The composition according to claim 1, for use as an alternative refrigerant for R410A.

7. A method for operating a refrigerating machine, comprising the step of circulating the composition according to claim 1 as an alternative refrigerant for R410A.

8. A refrigerating machine comprising the composition according to claim 1 as a working fluid.

9. A method for operating a refrigerating machine, comprising the step of circulating the composition according to claim 1 as a working fluid in a refrigerating machine.

\* \* \* \* \*